United States Patent
Boitouzet

(10) Patent No.: US 11,820,041 B2
(45) Date of Patent: Nov. 21, 2023

(54) PROCESS FOR SUPERCRITICAL OR SUBCRITICAL PARTIAL DELIGNIFICATION AND FILLING OF A LIGNOCELLULOSIC MATERIAL

(71) Applicant: SAS WOODOO, Paris (FR)

(72) Inventor: Timothée Boitouzet, Paris (FR)

(73) Assignee: SAS Woodoo, Paris (FR)

( * ) Notice: Subject to any disclaimer, the term of this patent is extended or adjusted under 35 U.S.C. 154(b) by 0 days.

(21) Appl. No.: 16/700,123

(22) Filed: Dec. 2, 2019

(65) Prior Publication Data

US 2020/0164542 A1 May 28, 2020

Related U.S. Application Data

(63) Continuation of application No. PCT/EP2018/065047, filed on Jun. 7, 2018.

(30) Foreign Application Priority Data

Jun. 7, 2017 (FR) ...................................... 1755078

(51) Int. Cl.
 *B27K 3/02* (2006.01)
 *B27K 3/08* (2006.01)

(52) U.S. Cl.
 CPC .............. *B27K 3/0207* (2013.01); *B27K 3/08* (2013.01); *B27K 2240/10* (2013.01)

(58) Field of Classification Search
 CPC ................ B27K 3/0207; B27K 3/08
 See application file for complete search history.

(56) References Cited

U.S. PATENT DOCUMENTS

| | | |
|---|---|---|
| 3,607,355 A | 9/1971 | Loeb et al. |
| 3,750,303 A | 8/1973 | Gates et al. |
| 3,968,276 A | 7/1976 | Allen |
| 4,178,861 A | 12/1979 | Vandernoek et al. |
| 4,239,906 A | 12/1980 | Antrim et al. |
| 4,348,256 A | 9/1982 | Bergstrom et al. |

(Continued)

FOREIGN PATENT DOCUMENTS

| | | |
|---|---|---|
| CA | 1095663 A | 2/1981 |
| CA | 1186855 A | 5/1985 |

(Continued)

OTHER PUBLICATIONS

Berglund L. et al.; "Lignin-Retaining Transparent Wood", ChemSusChem, 2017, No. 10, pp. 3445-3451.

(Continued)

*Primary Examiner* — Michael P Wieczorek
(74) *Attorney, Agent, or Firm* — Wilson Sonsini Goodrich & Rosati

(57) ABSTRACT

The invention concerns a process for treating lignocellulosic material, preferably wood, comprising the following successive steps:

(1) extracting lignin by a fluid in supercritical or subcritical phase to extract 40 to 85% by weight % of the lignin of the initial material;
(2) filling by a filling compound, preferably in the presence of a fluid in supercritical or subcritical phase; and
(3) finishing, so as to obtain a composite material formed by a three-dimensional network of filling compound that is transformed and incorporated in a network of cellulose and lignin.

20 Claims, 4 Drawing Sheets

(56) References Cited

U.S. PATENT DOCUMENTS

| | | | |
|---|---|---|---|
| 4,956,048 A | 9/1990 | Hise | |
| 4,992,308 A | 2/1991 | Sunol | |
| 5,041,192 A * | 8/1991 | Sunol | D21C 3/22 |
| | | | 162/63 |
| 5,169,687 A | 12/1992 | Sunol | |
| 6,242,245 B1 * | 6/2001 | Amann | C12P 1/00 |
| | | | 435/277 |
| 6,649,245 B2 | 11/2003 | Lenderink | |
| 6,670,077 B1 | 12/2003 | Huang | |
| 6,770,168 B1 | 8/2004 | Stigsson | |
| 6,830,784 B2 * | 12/2004 | Gutowski | B27K 3/346 |
| | | | 427/533 |
| 7,959,765 B2 | 6/2011 | Argyropoulos | |
| 8,546,109 B2 | 10/2013 | Varanasi et al. | |
| 8,575,374 B1 | 11/2013 | Delong et al. | |
| 8,772,406 B2 | 7/2014 | Linhardt et al. | |
| 8,986,501 B2 | 3/2015 | Li et al. | |
| 9,343,733 B2 | 5/2016 | Lee et al. | |
| 10,030,157 B2 | 7/2018 | Humiston et al. | |
| 10,538,012 B2 * | 1/2020 | Boitouzet | B27K 3/0221 |
| 11,254,026 B2 | 2/2022 | Boitouzet et al. | |
| 11,656,756 B2 | 5/2023 | Thevenin et al. | |
| 11,662,899 B2 | 5/2023 | Thevenin et al. | |
| 2002/0096274 A1 * | 7/2002 | Lindstrom | D21H 27/30 |
| | | | 162/72 |
| 2002/0142145 A1 | 10/2002 | Lenderink | |
| 2002/0154100 A1 | 10/2002 | Hatakeda et al. | |
| 2004/0090426 A1 | 5/2004 | Bourdelais et al. | |
| 2005/0110722 A1 | 5/2005 | Hayafuji | |
| 2005/0163935 A1 | 7/2005 | Magne et al. | |
| 2005/0233069 A1 | 10/2005 | Mikami et al. | |
| 2006/0262258 A1 | 11/2006 | Wang et al. | |
| 2008/0020222 A1 | 1/2008 | Hiraku et al. | |
| 2008/0160288 A1 | 7/2008 | Kingma et al. | |
| 2008/0223629 A1 | 9/2008 | Kashikawa et al. | |
| 2009/0176052 A1 | 7/2009 | Childs et al. | |
| 2009/0294186 A1 | 12/2009 | Fontanella et al. | |
| 2010/0081798 A1 | 4/2010 | Balensiefer et al. | |
| 2010/0156842 A1 | 6/2010 | Cherif | |
| 2011/0115723 A1 | 5/2011 | Wang et al. | |
| 2011/0220307 A1 | 9/2011 | Duggirala et al. | |
| 2011/0254778 A1 | 10/2011 | Wang et al. | |
| 2012/0105370 A1 | 5/2012 | Moore | |
| 2012/0146922 A1 | 6/2012 | Kang et al. | |
| 2012/0268693 A1 | 10/2012 | Takeda et al. | |
| 2013/0063684 A1 | 3/2013 | Chen et al. | |
| 2013/0167603 A1 | 7/2013 | Bathurst et al. | |
| 2014/0139560 A1 | 5/2014 | Jung et al. | |
| 2014/0186592 A1 | 7/2014 | Jeon et al. | |
| 2014/0269411 A1 | 9/2014 | Pelland et al. | |
| 2014/0311201 A1 | 10/2014 | Bathurst | |
| 2014/0311984 A1 | 10/2014 | Nakama et al. | |
| 2015/0035794 A1 | 2/2015 | Zhitomirskiy | |
| 2016/0010279 A1 | 1/2016 | Hu et al. | |
| 2016/0041646 A1 | 2/2016 | Cho et al. | |
| 2016/0187544 A1 | 6/2016 | Watanabe et al. | |
| 2016/0209551 A1 | 7/2016 | Bekku et al. | |
| 2016/0297970 A1 | 10/2016 | Garoff et al. | |
| 2017/0107641 A1 | 4/2017 | Busardo et al. | |
| 2018/0157111 A1 | 6/2018 | Ueki et al. | |
| 2018/0162891 A1 | 6/2018 | Miettinen | |
| 2018/0188870 A1 | 7/2018 | Boggs et al. | |
| 2018/0201765 A1 | 7/2018 | Sun et al. | |
| 2018/0208804 A1 | 7/2018 | Mieda et al. | |
| 2018/0318773 A1 | 11/2018 | Childs et al. | |
| 2018/0327612 A1 | 11/2018 | Humiston et al. | |
| 2018/0342702 A1 | 11/2018 | Hu et al. | |
| 2018/0370071 A1 | 12/2018 | Boitouzet et al. | |
| 2019/0012032 A1 | 1/2019 | Brandao Salgado et al. | |
| 2019/0077040 A1 | 3/2019 | Boitouzet et al. | |
| 2019/0113791 A1 | 4/2019 | Yamamoto et al. | |
| 2019/0121474 A1 | 4/2019 | Lee et al. | |
| 2019/0121481 A1 | 4/2019 | Schoenauer et al. | |
| 2019/0129543 A1 | 5/2019 | Watanabe | |
| 2019/0131572 A1 | 5/2019 | Gwon et al. | |
| 2020/0223091 A1 | 7/2020 | Hu et al. | |
| 2020/0238565 A1 | 7/2020 | Hu et al. | |
| 2020/0363721 A1 | 11/2020 | Aritoshi et al. | |
| 2021/0019033 A1 | 1/2021 | Thevenin et al. | |
| 2021/0122902 A1 * | 4/2021 | Hu | B32B 3/20 |
| 2021/0240588 A1 | 8/2021 | Balthazar De Lima Mussauer et al. | |
| 2021/0316471 A1 | 10/2021 | Thevenin et al. | |
| 2022/0134596 A1 | 5/2022 | Boitouzet et al. | |
| 2022/0283685 A1 | 9/2022 | Thevenin et al. | |
| 2023/0140418 A1 | 5/2023 | Patour et al. | |

FOREIGN PATENT DOCUMENTS

| | | |
|---|---|---|
| CN | 1429695 A | 7/2003 |
| CN | 1813900 A | 8/2006 |
| CN | 1872508 A | 12/2006 |
| CN | 1911612 A | 2/2007 |
| CN | 1985891 A | 6/2007 |
| CN | 101279458 A | 10/2008 |
| CN | 101476252 A | 7/2009 |
| CN | 101649125 A | 2/2010 |
| CN | 102152356 A | 8/2011 |
| CN | 102660885 A | 9/2012 |
| CN | 102704297 A | 10/2012 |
| CN | 102785274 A | 11/2012 |
| CN | 102864672 A | 1/2013 |
| CN | 202882247 U | 4/2013 |
| CN | 103370469 A | 10/2013 |
| CN | 103993042 A | 8/2014 |
| CN | 104275723 A | 1/2015 |
| CN | 104389216 A | 3/2015 |
| CN | 104448585 A | 3/2015 |
| CN | 104651964 A | 5/2015 |
| CN | 106243391 A | 12/2016 |
| DE | 19714302 A1 | 10/1998 |
| EP | 1312453 A2 | 5/2003 |
| EP | 2295215 A1 | 3/2011 |
| EP | 2366949 A1 | 9/2011 |
| EP | 2669382 A1 | 12/2013 |
| EP | 3047656 A1 | 7/2016 |
| EP | 2850109 B1 | 8/2017 |
| EP | 2935604 B1 | 11/2018 |
| EP | 3656520 A1 | 5/2020 |
| FR | 2507639 A1 | 12/1982 |
| FR | 2672296 A1 | 8/1992 |
| JP | S60242003 A | 12/1985 |
| JP | S6162574 A | 3/1986 |
| JP | S6297803 A | 5/1987 |
| JP | H02160986 A | 6/1990 |
| JP | H04336202 A | 11/1992 |
| JP | H04357023 A | 12/1992 |
| JP | H05138615 A | 6/1993 |
| JP | 2000514015 A | 10/2000 |
| JP | 2009073406 A | 4/2009 |
| JP | 2009531229 A | 9/2009 |
| JP | 2010042604 A | 2/2010 |
| JP | 2010163497 A | 7/2010 |
| JP | 2011225847 A | 11/2011 |
| JP | 2012009233 A | 1/2012 |
| JP | 2012510082 A | 4/2012 |
| JP | 2012093667 A | 5/2012 |
| JP | 2015020307 A | 2/2015 |
| JP | 2015157740 A | 4/2015 |
| JP | 2017504235 A | 2/2017 |
| JP | 2017207906 A | 11/2017 |
| JP | 6244808 B2 | 12/2017 |
| KR | 100977721 B1 | 8/2010 |
| RU | 2309039 C2 | 10/2007 |
| RU | 2007144304 A | 6/2009 |
| SU | 1657225 A1 | 6/1991 |
| WO | WO-9002612 A1 | 3/1990 |
| WO | WO-9002836 A1 | 3/1990 |
| WO | WO-2010089604 A1 | 8/2010 |
| WO | WO-2011112703 A2 | 9/2011 |
| WO | WO-2012080702 A2 | 6/2012 |
| WO | WO-2013005104 A2 | 1/2013 |
| WO | WO-2013066196 A1 | 5/2013 |
| WO | WO-2013144420 A1 | 10/2013 |

(56) References Cited

FOREIGN PATENT DOCUMENTS

| | | |
|---|---|---|
| WO | WO-2013181481 A1 | 12/2013 |
| WO | WO-2014002674 A1 | 1/2014 |
| WO | WO-2014113884 A1 | 7/2014 |
| WO | WO-2015084520 A1 | 6/2015 |
| WO | WO-2016138901 A1 | 9/2016 |
| WO | WO-2017029120 A1 | 2/2017 |
| WO | WO-2017098149 A1 | 6/2017 |
| WO | WO-2017136714 A1 | 8/2017 |
| WO | WO-2018013501 A1 | 1/2018 |
| WO | WO-2018068583 A1 | 4/2018 |
| WO | WO-2017098149 A9 | 5/2018 |
| WO | WO-2018120560 A1 | 7/2018 |
| WO | WO-2018130776 A1 | 7/2018 |
| WO | WO-2018182497 A1 | 10/2018 |
| WO | WO-2018191181 A1 | 10/2018 |
| WO | WO-2018211945 A1 | 11/2018 |
| WO | WO-2018224598 A1 | 12/2018 |
| WO | WO-2019055680 A1 | 3/2019 |
| WO | WO-2019155159 A1 | 8/2019 |
| WO | WO-2020058629 A1 | 3/2020 |
| WO | WO-2022008831 A1 | 1/2022 |

OTHER PUBLICATIONS

Berglund L. et al.; "Optically Transparent Wood from a Nanoporous Cellulosic Template: Combining Functional and Structural Performance", Biomacromolecules, 2016, No. 17, pp. 1358-1364.

Berglund L. et al.; "Transparent Wood for Functional and Structural Applications", Royal Society Publishing, Downloaded on Dec. 27, 2017, pp. 1-15.

Birkel, J. The surface impregnation of wood: II. use characteristics of impregnated wood: III. investigations of resin adhesives. (1946). Electronic Theses and Dissertations. Paper 1872.

Fink, S; Transparent Wood A New Approach in the Functional Study of Wood Structure1 Holzforschung, vol. 46, 1992, No. 5.

Ganeshram, et al. Synthesis and characterization of phenol formaldehyde resin as a binder used for coated abrasives. Indian Journal of Science and Technologie, vol. 6 (6S), Jun. 2013, p. 4816.

Grinins, et al. Investigation of Birch Wood Impregnation with Phenol-Formaldehyde (PF) Resins. Sep. 2018;Conference: 9th European Conference on Wood Modification, At Arnhem, The Netherlands.

Hu, L. et al; Highly Anisotripic, Highly Transparent Wood Compositee. Adv Mater. Jul. 2016;28(26):5181-7. doi: 10.1002/adma.201600427. Epub May 4, 2016.

Hu, L. et al; "Novel Nanostructured Paper with Ultrahigh Transparency and Ultrahigh Haze for Solar Cells", Nano Letters, 2014, 14, pp. 765-773.

International Search Report issued in International Patent Application. No. PCT/FR2016/053247, dated Mar. 7, 2017 (4 pages).

Li, et al. Lignin-Retaining Transparent Wood. ChemSusChem. Sep. 11, 2017; 10(17): 3445-3451.

Li, et al; "Wood Composite as an Energy Efficient Building Material: Guided. Sunlight Transmittance and Effective Thermal Insulation", 2016, Adv. Energy Mater., 6, 1601122, pp. 1-7.

Luce, Foster. Delignified Impregnated Wood. Research Engineer, Westcraft, Inc., Los Angeles, California. Oct. 1944: 654-657.

Nogi, M. et al; "Optically Transparent Nanofiber Paper", Advanced Material, 2009, 21, pp. 1595-1598.

Norman et al; "A new method for the determination of cellulose, based upon observations on the removal of lignin and other encrusting materials", Biochem J. 1933; 27(3): 818-831.

Preparation of wood pulp by sulfate (kraft) process, found at https://nptel.ac.in/courses/103103029/pdf/rnod4.pdf, Feb. 15, 2013.

Ritter, George J.; "Distribution of Lignin in Wood Microscopical Study of Changes in Wood Structure Upon Subjection to Standard Methods of Isolating Cellulose and Lignin", Industrial and Engineering Chemistry, Nov. 1925, vol. 17, No. 11, pp. 1194-1197.

Song, et al. Processing bulk natural wood into a high-performance structural material. Nature. Feb. 8, 2018; vol. 554, pp. 224+.

Swedish Standards Institute. SS-EN 13183-1. Moisture content of a piece of sawn timber—Part 1: Determination by oven dry method. Apr. 11, 2003 (This document contains the official English version of the European Standard EN 13183-1:2002).

U.S. Appl. No. 16/185,342 Notice of Allowance dated Sep. 4, 2019.

U.S. Appl. No. 16/185,342 Office Action dated Mar. 22, 2019.

U.S. Appl. No. 15/781,978 Office Action dated Feb. 13, 2020.

U.S. Appl. No. 15/781,978 Office Action dated Sep. 24, 2019.

Zhu, et al. Anisotropic, Transparent Films with Aligned Cellulose Nanofibers. Adv Mater. Jun. 2017;29(21).

Zhu, et al. Highly Anisotropic, Highly Transparent Wood Composites. Adv Mater. Jul. 2016;28(26):5181-7.

Zhu, et al; "Transparent and Haze Wood Composites for Highly Efficient Broadband Light Management in Solar Cells", 2016. Nano Energy, 26, pp. 332-339.

Chen, H. Lignocellulosic Material. From: Handbook of Thermoset Plastics (Third Edition), 2014.

Co-pending U.S. Appl. No. 17/576,799, inventors Boitouzet; Timothée et al., filed Jan. 14, 2022.

Engineering ToolBox, (2008). Refractive Index common Liquids, Solids and Gases. [online] Available at: https://www.engineeringtoolbox.com/refractive-index-d_1264.html.

Liew, et al. Direct Cellulase Gene Amplification From Hot Spring Using the Guidance of 16S rRNA Amplicon Metagenomics. In Metagenomics, 2018.

Mathews, et al. Bacterial biodegradation and bioconversion of industrial lignocellulosic streams. Appl Microbiol Biotechnol. Apr. 2015;99(7):2939-2954. doi: 10.1007/s00253-015-6471-y. Epub Feb. 27, 2015.

Mi, et al. Scalable aesthetic transparent wood for energy efficient buildings. Nature communications 11.1 (2020): 1-9.

PCT/EP2018/065047 International Search Report with Written Opinion dated Aug. 21, 2018.

PCT/FR2019/050262 International Search Report with Written Opinion dated May 23, 2019.

PCT/FR2019/052177 International Search Report with Written Opinion dated Jan. 16, 2020.

Roger M. Rowell, et al, Handbook of Wood Chemistry and Wood Composites, 2012.

Tanaka, et al. Solute diffusion into cell walls in solution-impregnated wood under conditioning process I: effect of relative humidity on solute diffusivity. J Wood Sci. (61):543-551 (2015). https://doi.org/10.1007/s10086-015-1503-x.

ToolBox—Refractive Index for some common Liquids, Solids and GasesSome common fluids and their refractive index Available at https://www.engineeringtoolbox.com/refractive-index-d_1264.html. Accessed on Apr. 2021.

Torres, D. Why knock on wood when touch will do? MSP Low-Power Plays—Blogs—TI E2E Community. May 25, 2017. Availabe at https://e2e.ti.com/blogs_/b/process/archive/2017/05/25/why-knock-on-wood-when-touch-will-do. Retrieved Oct. 1, 2020.

U.S. Appl. No. 15/781,978 Notice of Allowance dated Oct. 14, 2021.

U.S. Appl. No. 15/781,978 Office Action dated Jul. 6, 2020.

U.S. Appl. No. 15/781,978 Office Action dated May 14, 2021.

U.S. Appl. No. 15/781,978 Office Action dated Nov. 16, 2020.

U.S. Appl. No. 16/944,706 Office Action dated Apr. 1, 2021.

U.S. Appl. No. 16/944,706 Office Action dated Dec. 30, 2021.

Co-pending U.S. Appl. No. 17/824,222, inventors Thevenin; Raphaële et al., filed May 25, 2022.

Hexion. Hot topic: Evolving fire performance requirements can be met through the use of phenolic resins. Composite Materials. Railway Interiors International. Annual Showcase 2019. pp 74-75. Retrieved online at https://www.hexion.com/docs/default-source/psr/evolving-fire-performance-requirements-can-be-met-through-the-use-of-phenolic-resins.pdf?sfvrsn=aae6b95e_4.

The Dow Chemical Company. Ethanolamines: Monoethanolamine Diethanolamine Triethanolamine. Published Jan. 2003. 21 pages. Retrieved online at http://www.resikem.com.ar/images/dow-ethanolamines.pdf.

U.S. Appl. No. 16/944,706 Notice of Allowance dated Aug. 5, 2022.

U.S. Appl. No. 16/944,706 Notice of Allowance dated Jun. 16, 2022.

(56) References Cited

OTHER PUBLICATIONS

U.S. Appl. No. 16/944,706 Notice of Allowance dated May 18, 2022.
U.S. Appl. No. 17/576,799 Office Action dated Jun. 8, 2022.
U.S. Appl. No. 17/576,799 Office Action dated Apr. 28, 2023.
U.S. Appl. No. 17/824,222 Notice of Allowance dated Apr. 19, 2023.
Co-pending U.S. Appl. No. 18/148,227, inventors Patour; Sébastien et al., filed Dec. 29, 2022.
Co-pending U.S. Appl. No. 18/168,920, inventors Thevenin; Raphaële et al., filed Feb. 14, 2023.
PCT/FR2021/051236 International Search Report with Written Opinion dated Sep. 24, 2021. (English Translation).
U.S. Appl. No. 16/944,706 Notice of Allowance dated Jan. 31, 2023.
U.S. Appl. No. 16/944,706 Notice of Allowance dated Sep. 7, 2022.
U.S. Appl. No. 17/576,799 Office Action dated Sep. 21, 2022.
U.S. Appl. No. 17/824,222 Notice of Allowance dated Dec. 29, 2022.
U.S. Appl. No. 17/824,222 Notice of Allowance dated Jan. 12, 2023.
U.S. Appl. No. 17/824,222 Notice of Allowance dated Jan. 27, 2023.
U.S. Appl. No. 17/824,222 Office Action dated Aug. 18, 2022.

\* cited by examiner

PROCESS FOR SUPERCRITICAL OR SUBCRITICAL PARTIAL DELIGNIFICATION AND FILLING OF A LIGNOCELLULOSIC MATERIAL

CROSS-REFERENCE

This application is a continuation of International Application No. PCT/EP2018/065047, filed Jun. 7, 2018, which claims priority to French Application No. 1755078, filed Jun. 7, 2017, both of which are herein incorporated by reference in their entirety.

BACKGROUND

It is known that certain mechanical properties of wood, such as the resistance to compression and the resistance to bending, can be improved by impregnation of the wood with at least one monomer and/or polymer. Such wood impregnated with a monomer and/or a polymer is commonly designated a wood composite. It is generally solid wood impregnated superficially, i.e. generally to a small thickness from the surface (generally to a depth from the surface of 4 to 6 mm).

A known process for producing wood composite comprises the immersion of the wood to treat in a fluid such as an aqueous solution, in which is dissolved the monomer and/or the polymer, and the pressurization of the fluid, so as to incorporate the monomer and/or the polymer into the wood. However, such a process is long and requires the use of a high pressure so as to impregnate the wood at depth.

An improvement to this process has thus been sought, for example through use of a partial vacuum. However, no satisfactory solution has appeared, since all the techniques thus envisioned are penalized by their long duration, mainly due to the difficulty of impregnating the pores of the wood at depth.

It is also known to impregnate the wood with methyl methacrylate (MMA) then to polymerize the monomer so impregnated. The polymerization may for example be carried out using high-energy radiation such as laser beams or gamma rays. This method is slow, and the use of high-energy radiation proves to be particularly costly.

Furthermore, is has been proposed in document WO 90/02612 to perform impregnation of wood by a monomer in an acidic or basic (alkaline) medium through use of fluid in supercritical phase. This fluid in supercritical phase facilitates the impregnation of the monomer or of the polymer into the porous material.

A first embodiment proposed in WO 90/02612 comprises the impregnation of wood with an alkaline or acidic medium in the presence of a first fluid maintained in supercritical conditions, the digestion of the wood impregnated by this medium in the presence of a second fluid maintained in supercritical conditions, so as to extract extractive substances and lignin from the wood, which may then be separated from the fluid. The wood so obtained, constituted by fibers that are generally discrete, is recovered then converted into paper.

This first embodiment is solely reserved for wood chips, since it appears that a very large proportion, if not the entirety, of the lignin is extracted from the wood, which leads to destroying the internal architecture of the wood. Thus, in the examples of WO 90/02612, these chips are reduced to the state of pulp once the extractive substances and the lignin have been extracted. The pulp so obtained, in the state of discrete fibers agglomerated into a paste, enables wood board to be formed (of the fiberboard type) of higher quality in terms of mechanical properties relative to the state of the art.

A second embodiment proposed in WO 90/02612 comprises the treatment of a material containing cellulose by a first fluid in supercritical phase, so as to extract the extractive substances (but not the lignin) from the material comprising the cellulose; the separation of the fluid containing the extractive substances from the material, so as to obtain a material comprising fewer extractive substances; the placing in contact of the material containing the cellulose and fewer extractive substances with a second fluid in supercritical phase comprising a polymerizable monomer, in sufficient conditions to enable the impregnation of the monomer into the material; the precipitation of the monomer inside the cellulose; and the polymerization of the precipitated monomer in situ. This material apparently presents improved properties.

This second embodiment is especially reserved for pieces of wood of a certain size. Thus, in the examples, lumber (large blocks or logs of wood) are treated either with MMA or with styrene However, the two embodiments described in WO 90/02612 do not enable the micro-architecture of the wood to be preserved while enabling a filling material to sufficiently replace the lignin. As a matter of fact, the treatment according to this document either produces practically total delignification, which leads to pulp being obtained, or produces very slight delignification, or even none at all. More recently, document WO 2010/089604 has described the obtaining of parts of lignocellulosic material produced by impregnation of the material with a formulation based on acetic anhydride at acid pH, then impregnation of the material with an aqueous organic product based formulation, followed by pressurization so as to impregnate the two solutions into the material, then heating so as to crosslink the organic material present in the lignocellulosic material so impregnated. This makes it possible to manufacture a piece of hardened lignocellulosic composite material. However, the filling of the piece of material by the organic product can only be partial or even superficial (i.e. to a small depth from the surface as explained above). This means that the treatment of a relatively thick piece cannot give improved mechanical strength properties. By "relatively thick" is meant here generally approximately 10.16 cm (4 inches) according to the American USA standards for "logs" (pieces of lumber), or 27 mm according to French saw-mill standards for plank thicknesses.

SUMMARY

Thus, the methods known to date for impregnation of wood, or of any other lignocellulosic material, to make of it a material of greater strength, are complicated methods to implement and are relatively costly. Furthermore, their implementation is much too slow to be able to realistically envision industrial production of a wood composite material.

Therefore, there still remains today the need to have a process for treating a structure of lignocellulosic material, preferably wood, so as to obtain a structure preserving the architecture of the wood, and constituted by a material with improved mechanical properties, in particular in terms of resistance to bending and resistance to compression, relative to the lignocellulosic material before treatment. By "treating a structure of lignocellulosic material", is meant here the treatment of the matter constituting that material.

One of the objectives of the invention is to mitigate the drawbacks referred to above of the methods of the state of the art, and in particular to provide a process for treating lignocellulosic material that is effective and achievable at industrial scale, which enables a material to be obtained preserving the architecture of the wood and having improved mechanical, chemical and/or optical properties.

The present invention concerns a treatment process for modifying lignocellulosic material. In particular, the invention concerns a process for partial delignification and filling of a structure of lignocellulosic material. The lignocellulosic material is preferably wood. A modified lignocellulosic material (referred to as "composite") obtained by this process is such that its native architecture has been substantially and advantageously preserved.

The invention is thus directed to a treatment process for treating a structure of lignocellulosic material, the lignocellulosic material being preferably wood, said process comprising the following successive steps:

(1) at least one step of extracting lignin from a structure of lignocellulosic material by at least one fluid in supercritical or subcritical phase, the lignin being extracted in an amount from 40 to 85%, by weight %, relative to the lignin initially present in the material;

(2) at least one step of filling the partially delignified structure with at least one filling compound, so as to produce a filled partially delignified structure; and (4) at least one step of finishing the filled partially delignified structure, so as to obtain a composite material structure formed of a three-dimensional network of transformed filling compound incorporated in a network of cellulose and lignin.

The process for treating a structure of lignocellulosic material according to the invention comprises the new and innovative combination of partial delignification of the structure followed by filling with a compound which is stabilized within the structure so delignified. In particular, the controlled use of a fluid in supercritical or subcritical phase, possibly accompanied by a cosolvent, makes it possible to improve the extracting step (1).

This combination of steps (1) to (3) advantageously enables a composite material to be obtained that substantially preserves the structure of the material and is formed by two interpenetrated networks, in which the architecture of the lignocellulosic material has been altered at the nanoscopic scale but has been substantially preserved at the microscopic and macroscopic scales.

According to a preferred variant of the invention, the process further comprises at least one intermediate step of functionalizing the partially delignified structure resulting from the extracting step (1), situated between the extracting step (1) and the filling step (2). The filling step is thus carried out not on the partially delignified structure resulting from the extracting step (1), but on the partially delignified structure resulting from the intermediate functionalizing step.

The composite material structure obtained by the process according to the invention comprises lignin, hemicellulose, cellulose and at least one filling compound, the composite material forming a three-dimensional network of transformed filling compound incorporated into a structure of cellulose and lignin. The properties of the lignocellulosic material, which has been transformed by the process according to the invention into composite material, whether they be mechanical, chemical and/or optical, are notably improved relative to the material before treatment.

The invention is also directed to an installation suitable for the implementation of the process according to the invention.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

In the Figures, identical parts are represented by the same references.

DETAILED DESCRIPTION OF THE INVENTION

Definitions

Figure 1:
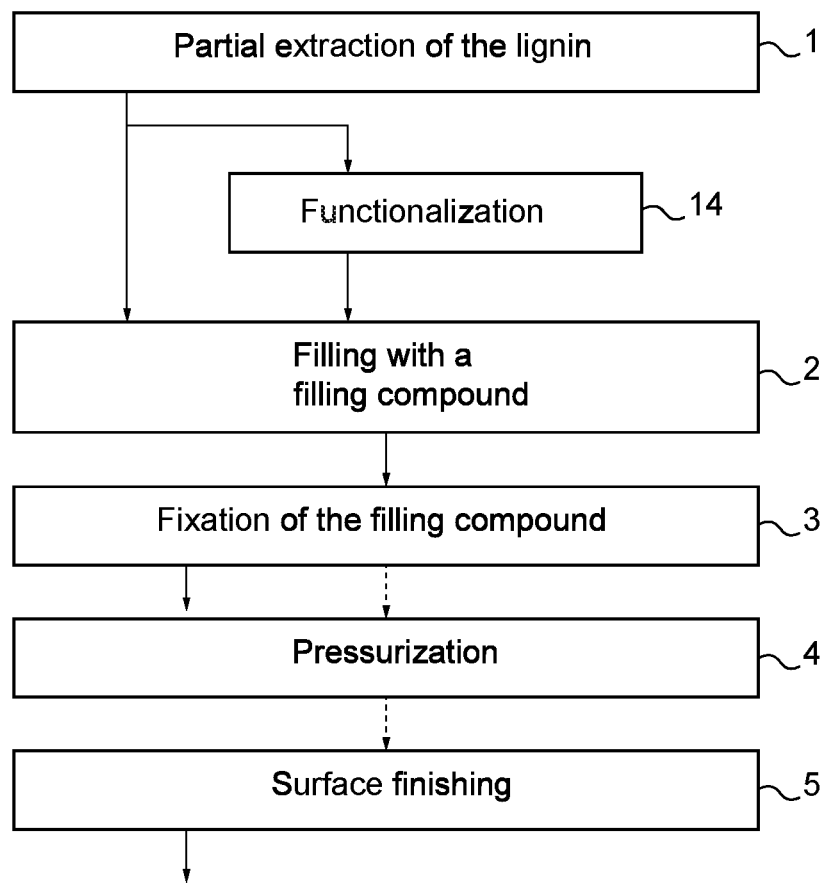
FIG. 1 diagrammatically represents the different steps of the treatment process according to the invention.

By "architecture" of the lignocellulosic material is meant a hierarchized ensemble, of multi-scale organization, i.e. the macroscopic, microscopic, or nanoscopic scales, providing mechanical solidity to the ensemble. All or part of the structure of lignocellulosic material obtained by the process according to the invention arises from the architecture of the wood, of which a few components are briefly reviewed below.

At the atomic scale, wood comprises approximately 50% carbon atoms, 6% hydrogen atoms and 40% oxygen atoms, as well as traces of inorganic compounds and organometallic complexes. More specifically, wood is composed of 60 to 75% carbohydrates in the form of cellulose and hemicelluloses, as well as 18 to 35% lignin. The hemicelluloses are peripheral inclusions on bundles of cellulose, the lignin, by virtue of its transverse physical and chemical links with the hemicelluloses, anarchically serving as transverse linking between those bundles and thus as bracing for the architecture. At the macroscopic scale, two parts are particularly distinguished in wood: heartwood (duramen), of darker color, and sapwood. These two parts have growth rings in which the wood from spring and the darker wood from summer are distinguished.

The plant cell, constituted by a cavity, the lumen, a wall and intercellular channels for transport of the sap, called pits, is a construction unit at the microscopic scale. In the living state, the cavities of the cells of wood close to the bark of the tree provide the transport of the sap from the roots to the extremities of the tree, while the walls provide the functions of mechanical strength. The cells die progressively with the growth of the tree, henceforth providing only the bracing of the tree. The walls of the cell are constituted by the stacking of three distinct layers (the middle lamella, the primary wall and the secondary wall) with specific physico-chemical properties. Each of these cell layers is constituted mainly by three polymers: lignin, cellulose and hemicelluloses. Lignin, present principally in the middle lamella of the plant cell wall, attaches the cellulose fibrils together and provides the support for the structure of the wood. The multi-scale architecture of the wood is anisotropic. It provides the mechanical solidity and opacity of the lignocellulosic material ensemble. The architecture and the microscopic and nanoscopic structure of the components depend on the wood considered.

The respective quantities and quality of the lignin, cellulose and hemicelluloses are variable depending on the nature of the wood and of the tree considered, that is to say of the part of the tree, on the environment and on the maturity of the tree considered. The cellulose is partially semi-crystalline while the lignin is amorphous. The lignin is dark brown in color while the cellulose and the hemicelluloses are instead white in color. These three polymers are interlaced to such an extent that the material has nanoscopic porosity, in which substances called extractives are present. Although anchored in the material (mainly by physico-chemical links), these substances are independent from the network constituted by the lignocellulosic material.

The "extractives" are substances that absorb visible light intensely. Their presence inside porosity implies the existence of a high number of interfaces, which has an incidence on the diffusion and propagation of light radiation within the material. The term "extractives" groups together a large set of substances resulting from secondary metabolites synthesized during the growth of the lignocellulosic material. They are present in relatively low amounts (between 5 and 10% by weight) in the form of mixtures, sometimes complex, and highly variable, which are linked to the nature of the lignocellulosic material. The variability of these substances (in amount and quality) is great. The composition of the soil and the climate of the location of growth of a lignocellulosic material considered greatly influence the chemical identity of this material, including that of its extractives.

The extractives group together substances having structures, functionalities and properties which are very varied, which may be polar or non-polar, hydrophilic or hydrophobic, linear, monoaromatic or polyaromatic. Among the extractives may be cited the following compounds: waxes and fats, terpenes (monoterpenes, diterpenes, triterpenes, sesquiterpenes, diterpene acids) and phenolic compounds (derivatives of phenols, lignans, stilbenes, flavonoids, biflavonoids, condensed tannins, hydrolysable tannins).

The extractives provide an additional chemical protection for the wood. Indeed, they are often involved in the defense mechanisms of the lignocellulosic material against external attacks, such as fungi, enzymes, xylophagous insects, microbes. They are also at the origin of the smell, in part the color, as well as the length of life intrinsic to the lignocellulosic material.

Moreover, the architecture of the lignocellulosic material is qualified as "native" (or "natural") when the material, whatever the scale of organization at the level from which observation is made, has similar properties to those encountered in the lignocellulosic material not having undergone any treatment.

The term "chemical anchorage" relates to a molecular bond between two compounds, while the terms "physico-chemical anchorage" relate to a bond of the hydrogen bond type, van der Waals type, ionic type or metallic type between two compounds.

The term "architecture space of the wood" also below more simply called "space" or "volume" (corresponding to a substantial absence of matter) relates to the microscopic cavities of the wood and to the pits which join them, filled with sap in the living cells, but also to the nanoscopic spaces between the interlaced chains of polymers contained in the walls of the cells.

By "structure of lignocellulosic material" is meant according to the invention an object in three-dimensions constituted by lignocellulosic material, and having a certain volume (three-dimensional) of at least 3 $cm^3$ approximately, preferably at least 4 $cm^3$ approximately. It is a macroscopic object which has substantially kept the architecture of the native lignocellulosic material. Thus, preferably, the structure of lignocellulosic material comprises at least one dimension of at least 5 mm, preferably at least 2.5 cm, and at most 40 cm. According to a preferred embodiment, the structure may virtually be included in a parallelepiped of which each of the three dimensions is at least 5 mm, preferably at least 2.5 cm. When the lignocellulosic material is wood, the structure may typically be a cut section of wood (transverse cut, longitudinal cut, radial cut) for example of thickness 5 to 7 mm or even 18 mm.

More specifically, the structure of lignocellulosic material may be a trimming member, a finishing member or a structure member.

By "trimming member" is meant according to the invention an object in three dimensions of which one of the dimensions, generally the thickness, is very much less than the other two dimensions and typically of at least approximately 0.5 mm, preferably at least approximately 1 mm, more preferably at least approximately 2 mm and still more preferably of at least approximately 5 mm. This object is generally chosen from the group formed by laminae of wood, marquetry elements, coverings, veneer, thick veneer and layers of wood, preferably veneer and thick veneer. It substantially corresponds to the term "veneer", preferably "thick veneer".

By "finishing member" is meant according to the invention an object in three dimensions of which one of the dimensions, generally the thickness, is very much less than the other two dimensions and typically of at least approximately 10 mm, preferably at least 18 mm, still more preferably at least approximately 27 mm. This object typically corresponds to the finishing work in building, that is to say that it is chosen from the group formed by cladding, battens, slats, skirting boards, parquets, partitions, panels, roof coverings and joinery work. This substantially corresponds to the term "timber".

By "structure member" is meant according to the invention an object in three dimensions which is typically a construction member, and of which the smallest of the three dimensions is typically at least approximately 10 cm. This object corresponds to the structure (or construction work) in the building, that is to say it is chosen from the group formed by posts, beams, lattice structures and frameworks. This substantially corresponds to the term "lumber". This object also comprises Cross-Laminated Timber (CLT), which are boards constituted by at least three monolayer sheets bonded onto each other and disposed in crossed plies, in other words perpendicularly to each other. In general, CLT boards are composed of 3 to 7 layers of wood, the orientation of the fibers of the wood being crossed in one layer relative to the adjacent layer or layers. These different layers of wood oscillate between 2 cm and 8 cm in thickness, the board reaching a total thickness varying from 6 cm for the thinnest to 28 cm for the thickest.

By "building member" is meant according to the invention a member from the technical field of building, that is to say a construction member, which is either a trimming member, a finishing member or a structure member.

By "fluid" is meant according to the invention liquid or gas.

By "extraction" is meant according to the invention a removal and an evacuation of matter from the structure.

By "green wood" is meant wood still containing molecules of water that are free or linked to the cell network, such as freshly felled wood. Thus, freshly felled wood is wood generally containing 100% relative moisture content, whereas "damp wood" (or "surface-dry wood") by definition only contains molecules of water in the cavities of the cell network i.e. approximately 25% relative moisture content. Green wood, on the other hand, in general contains 40 to 100% of relative moisture content. The measurement of the (relative) moisture content of wood is defined by the National Committee for the Development of Wood (of which the initialism in French is CNDB) as the ratio of the mass of water it contains to its anhydrous mass. It is expressed by the following formula:

Moisture content (%)=[(Humid mass−Anhydrous mass)×100]/Anhydrous mass.

According to the CNDB, at the time of felling, wood may contain more water than wood-matter; sometimes twice more in certain poplars. The relative moisture content is then greater than 100%. As a matter of fact, the cell voids of green wood are filled with free water. It is progressively evacuated by evaporation, without the wood undergoing shrinkage or deformation: this is referred to as the "surface-drying" phase. When the free water has entirely disappeared (saturation point), there only remains bound water which impregnates the cell membranes. The departure of this bound water leads to phenomena of shrinkage and deformation. The saturation point for wood fibers, below which "shrinkage and swelling" of the wood occurs, is of the order of 30% for all kinds.

By "dry wood" is meant wood which has undergone treatment to reduce the percentage of water retained in the cell walls, of which the degree of moisture content is in general situated from 8 to 15%, preferably 7 to 12%.

By "A and/or B" is meant A, or B, or A and B.

By "weight %" is meant the percentage by mass. Unless otherwise stated, any percentage indicated in the present description is a percentage by mass.

Lignocellulosic Material

Particularly preferably, the lignocellulosic material is wood. This wood may, according to the invention, be green wood, damp wood or dry wood, preferably green wood. For example, it may be wood used after possible storage for a period of greater or shorter length (a few days to a few years). This wood may have been transformed after felling, that is to say have been cut up, cut to length, planed, freed from its bark, from its sapwood or from its heartwood, or be engineered wood.

It is particularly advantageous according to the invention to be able to treat green wood or even damp wood since this makes it possible to make non-negligible saving of a prior drying step for the wood. More particularly, in the usual processes for treatment of wood, the latter is generally dried in advance. This results in approximately 20% of matter being lost during the drying by shrinkage of the cell matrix. Generally, for use, for example in the case of parquet, approximately 20% of additional matter is lost by the re-cutting of the wood to unwarp (or pre-plane) the piece of wood further to the cause of the reduction in the humidity level (which passes from 70% on leaving the saw-mill to 12% on leaving the drier and lastly to 7% in the final piece of parquet). It is thus not far from 40% of matter which is lost by these operations. The fact of being able to treat the wood directly according to the invention is thus very economical not only in quantity of treatment operations to carry out (saving in labor, saving in storage and saving in time between the raw material and the final product), but also by the fact that the loss of matter is considerably less.

It may also be aged wood, that is to say wood already having served for example as construction wood. Thus, the process of the invention advantageously makes it possible to recycle, and thus add value to, construction wood.

Practically all kinds of wood, also called wood families, of which the lignin content is comprised between 15 and 35%, preferably between 18 and 32%, and still more preferably between 20 and 30%, by weight, may be treated by the process according to the invention, whether they belong to the family of the angiosperms or of the gymnosperms, whether they are high-value wood of oak or ash type, or more conventional wood, whether it be used in furnishings or in the building sector (construction) for example furnishing wood such as ash, construction wood such as pine, beech or Douglas fir or more malleable wood used for turning wooden parts or for model-making such as poplar or certain species of balsa.

Softwood may thus be cited such as that of gymnosperms, preferably fir, pine, Douglas fir, white, red or black spruce, balsam fir, or hardwood such as tilia, poplar, *Robinia pseudoacacia*, alder or willow. More generally, softwood is chosen from the group formed by Norway pine, pine, spruce, yew, larch, fir, arolla pine, Douglas fir, monkey puzzle, juniper, cedar, sequoia, thuya and cypress.

Hardwood is chosen from the angiosperms, preferably chosen from the group formed by alder, birch, balsa, beech, ash, eucalyptus, cottonwood, hevea, poplar, aspen, willow, *Robinia pseudoacacia*, oak, mahogany, guatambu, korina, meranti, tilia, chestnut, maple, horse-chestnut, elm, hazel, walnut, Osage orange, plane tree, sycamore, apple, pear, lemon and tulip tree, and more preferably alder, birch, balsa, beech, ash, eucalyptus, cottonwood, hevea, *Robinia pseudoacacia*, oak, mahogany, tilia, chestnut, maple, horse-chestnut, elm, hazel, walnut, Osage orange and plane tree.

Each kind so cited may comprise a great many species. Thus, the pine kind for example covers more than a hundred species such as the maritime pine or the Scots pine; the oak kind covers numerous sub-kinds, such as red oak (known as American oak) or pedunculate oak (known as European oak).

Each kind of wood has an architecture and a chemical identity (that is to say respective amounts of lignin and hemicelluloses, a length of cellulose fibers, and extractives) which are specific to it. Within the same tree, the different parts of the wood (such as the sapwood or the heartwood) may also have different physico-chemical properties according to the kind considered.

However, the lignocellulosic material may also be any material formed by a three-dimensional network of cellulose, and lignin, for example such as straw, natural textiles (such as linen and hemp), the entire forestry biomass, including bamboo, high-yield pulp, paper, cardboard, and cotton, provided that material is in the form of a structure having a certain mechanical strength and a micro-architecture suitable for enhancement by a filling compound which partially replaces the lignin. Such a list comprises the fibrous components (that is to say containing fibers in the native state), such as hemp or linen, but also the fibered components (that is to say transformed products containing an addition of fibers) and annual grasses.

Extracting Step (1)

The extracting step (1) enables the partial and controlled dissolving of part of the lignin, initially present in the material, into the fluid which is in supercritical or subcritical phase, accompanied by evacuation of that lignin by the fluid. Thus, partial and controlled delignification is made of the structure of lignocellulosic material. The lignin and the fluid are next generally separated, on depressurization of the fluid which was in supercritical or subcritical phase. This separation enables the recovery of a compound called "extract" comprising the lignin and possible extractives. In other words, the extracting step (1) enables the desired amount of lignin in the structure to be kept and not to significantly adversely affect the micro-architecture of the lignocellulosic material.

The lignin is present in the extract recovered at the end of extracting step (1), most often in the form of fragments. In addition to the molecules resulting from the degradation of lignin, products of degradation of other components of the lignocellulosic material may be found in the extract, such as molecules resulting from the degradation of the amorphous parts of the cellulose, simple sugars produced from the peripheral hemicelluloses, or even certain extractives. Extracting step (1) serves in particular to avoid limitation, by the presence of the dissolved compounds within the structure, of the filling of the spaces that exist in the native state and those created during the same extracting step (1) by the filling compound during the soaking step (2).

Another of the advantages of the use of fluid in supercritical or subcritical phase for the extracting step (1) is that it is possible to perform total or partial recycling of the fluid after a first use.

The partial delignification according to the invention excludes obtaining a pulp of lignocellulosic material fibers.

In general, the fluids in supercritical or subcritical phase are characterized by low viscosities and high diffusivities. They may thus advantageously improve the mass transfer of the extraction. The contact angle of a compound in supercritical phase with a substrate is equal to zero, which means that the compound completely "wets" its substrate: thereby, the lignocellulosic material is more easily filled by the fluid of the extracting step (1) if the latter is in supercritical phase. This is also true when the fluid is in subcritical phase.

The extracting step (1) thus makes it possible both to keep sufficient lignin (in native form or in a form regenerated after recombination of the radicals formed on degradation of the lignin) within the material to preserve the architecture of the native lignocellulosic material, and to extract sufficient lignin by virtue of the fluid in supercritical or subcritical phase to release space, within the architecture of the lignocellulosic material, into which the filling compound of step (2) will become inserted. Furthermore, it also enables the cleaning of the lignin and any extractives of residual lignin within the structure. Thus, it does not limit the filling of the existing microscopic or nanoscopic spaces, nor of those newly created in extracting step (1), by the filling compound during the filling step (2). Such a limitation could strongly inhibit the propagation of the polymer chains by the action of aromatic hydroxyl groups (OH) which would block the radicals generated by a polymerization catalyst.

This is generally made possible by the modulation and the optimization of the operating conditions of extraction, accessible to the person skilled in the art. As a matter of fact, the person skilled in the art is capable of adapting the operating conditions by virtue of his or her general technical knowledge.

The person skilled in the art can, at the end of the process, make an estimation of the degree of delignification achieved during the process, either by a qualitative analysis, linked to the color of the extract (the darker the extract, the more lignin it contains given that cellulose and hemicellulose are white in color); or by a quantitative analysis of the amount of lignin recovered in the extract. At the end of the process, he/she may also use the loss of mass of the structure of lignocellulosic material, due to the extraction of the lignin, as a basis for estimating the degree of delignification.

The operating conditions depend among other things on the nature of the fluid in supercritical or subcritical phase.

The extracting step (1) is generally carried out in static or dynamic mode, in one or more sub-steps, by means of one or more fluids in supercritical or subcritical phase.

By "dynamic mode" is meant according to the invention that the fluid (possibly mixed with a cosolvent) moves during the process within the vessel in which the process is implemented, preferably regularly over time (constant rate). This movement is generally generated by a continuously operating pump, with recirculation of the fluid coming from the vessel into the vessel, for example after a purification and/or filtration treatment.

By "static mode" is meant according to the invention that the fluid (possibly mixed with a cosolvent) is not in movement during the process, but is practically stationary within the vessel within which the process is implemented.

The main operating conditions of extraction are generally pressure, temperature, and duration, as well as the nature and amount of cosolvent if a cosolvent is present. Other operating conditions not directly linked to the extraction but making it possible to optimize the extracting step are the presence (or absence) of stirring and the parameters of the structure of lignocellulosic material such as its composition or the thickness of its structure. Furthermore, putting the fluid in supercritical or subcritical phase is generally carried out in the presence of the structure of lignocellulosic material, by application of pressure and temperature. Thus, the speed of application of pressure (i.e. pressurization) as well as the speed of depressurization are parameters to consider. Indeed, as is immediately apparent to the person skilled in the art, the pressurization and depressurization should not be carried out too fast, in order to evacuate the extracted lignin and not to modify the physical and optical properties of the lignocellulosic material.

Although this is not preferred, it is possible for the delignification not to be made homogenously within the lignocellulosic material, in particular according to the operating conditions of step (1). This is especially the case when the thickness of the structure of lignocellulosic material is great.

The extracting step (1) is generally carried out, according to a preferred embodiment of the invention, using carbon dioxide ($CO_2$) in supercritical phase in dynamic mode or static mode, for 1 to 72 h, preferably from 2 to 72 h, and still more preferably from 4 to 24 h, at a pressure of 8 to 40 MPa (80 to 400 bar), preferably 15 to 20 MPa (150 to 200 bar) and at a temperature comprised between 35 and 200° C., preferably between 50 and 200° C., still more preferably either between 160 and 200° C. or between 140 and 160° C. In this case, preferably, the stirring is generally from 10 to 100 rpm ("rpm" standing for "revolutions per minute"), preferably from 10 to 50 rpm, the pressurization speed is generally from 0.5 to 1 MPa/min (5 to 10 bar/min), preferably from 0.4 à 0.6 MPa/min (4 to 6 bar/min), and the depressurization speed is generally from 0.2 to 0.5 MPa/min (2 to 5 bar/min), preferably from 0.2 to 0.3 MPa/min (2 to 3 bar/min).

The stirring during the extracting step (1) advantageously improves the dissemination of the fluid phase within the lignocellulosic material and thus the extraction, whether it be in static mode or in dynamic mode. It may be carried out by mechanical or wave action, such as sonic action.

The extracting step (1) can also be carried out using water in subcritical phase in dynamic mode or static mode, for 0.5 to 4 h, at a pressure of 1.2 to 25 MPa (12 to 250 bar), preferably from 1.2 to 20 MPa (12 to 200 bar) and at a temperature comprised between 60 and 180° C., preferably between 120 and 180° C. In this case, the stirring is generally from 10 to 100 rpm, the pressurization speed is generally from 0.5 to 1 MPa/min (5 to 10 bar/min), and the depressurization speed is generally from 0.2 to 0.5 MPa/min (2 to 5 bar/min).

The extracting step (1) can also be carried out using isopropanol or t-butanol in supercritical phase in dynamic mode or static mode, for 0.5 to 8 h, at a pressure of 4 to 8 MPa (40 to 80 bar) and at a temperature comprised between 185 and 275° C. In this case, the stirring is generally from 10 to 100 rpm, the pressurization speed is generally from 0.5 to 1 MPa/min (5 to 10 bar/min), and the depressurization speed is generally from 0.2 to 0.5 MPa/min (2 to 5 bar/min).

The fluid in supercritical or subcritical phase may comprise at least one minority solvent, called cosolvent. The cosolvent is a liquid compound added in a small amount and which is miscible with said fluid. The cosolvent generally serves to improve the solvation power of the primary solvent in relation to the one or more species to dissolve and to improve the swelling/expansion of the lignocellulosic material. The presence of the cosolvent is thus particularly advantageous for optimizing the extracting step (1).

The fluid in supercritical or subcritical phase is preferably chosen from:
- carbon dioxide $CO_2$ in supercritical phase, preferably mixed with at least one polar cosolvent chosen from dioxane, water, methanol, ethanol, acetic acid, acetone and mixtures thereof;
- at least one alcohol in supercritical phase, said alcohol being chosen from t-butanol (or tert-butanol, IUPAC name 2-methylpropan-2-ol) and isopropanol (IUPAC name propan-2-ol);
- ethanol, acetone or methanol in subcritical phase, preferably mixed with water as cosolvent, still more preferably in a small amount;
- water in subcritical phase, preferably mixed with at least one base such as ammoniac, lithium hydroxide (LiOH), potassium hydroxide (KOH), calcium hydroxide (Ca$(OH)_2$), sodium carbonate ($Na_2CO_3$), potassium carbonate ($K_2CO_3$) or at least one acid such as formic acid and acetic acid.

Cosolvent is also to be mentioned for the base or the acid mixed with water in subcritical phase.

The cosolvent may, and preferably should, be present, as indicated above, in the fluid in supercritical or subcritical phase. However, it may be introduced into a reactor for implementation of the extracting step independently of the fluid that is to be put in supercritical or subcritical phase. It may also be introduced simultaneously or mixed with the fluid that is to be put in supercritical or subcritical phase.

According to the invention, the use of fluid is particularly preferred for which the carbon footprint is minimum, such as water or carbon dioxide. In this case, the presence of at least one cosolvent in the supercritical phase in the case of use of carbon dioxide or in the subcritical phase in the case of the use of water is particularly advantageous, since it makes it possible to improve the extraction conditions.

Thus, in the case of the use of $CO_2$ in supercritical phase, the addition of a cosolvent makes it possible to improve the polarity of the fluid in supercritical phase, and therefore the solubility of the lignin (which is polar) in the fluid phase (nonpolar), as well as the expansion of the cellulose macrofibrils.

In the case of the use of subcritical water, the addition of base or of acid playing the role of cosolvent makes it possible to improve the dissolution of the lignin and the swelling/expansion of the cellulose macrofibrils.

The supercritical coordinates of carbon dioxide are relatively gentle, that is to say beyond 31° C. and 7.4 MPa (74 bar). Carbon dioxide in supercritical phase is particularly preferred, because it has good solvent power for the extraction of the nonpolar compounds, its high dipole moment enabling it to dissolve certain weakly-polar compounds, and the possible addition of cosolvent, preferably polar cosolvent within it makes it possible to improve the dissolution of the polar molecules in that fluid in supercritical phase.

The subcritical coordinates of water are under 374.3° C. and 22.1 MPa (221 bar). The advantages, among others, of the use of subcritical water for the extraction are: the use of moist lignocellulosic materials without going through the drying step, the use of a green solvent, the limitation of the extraction of coproduct by improving the selectivity and the implementation of an extracting step without the addition of chemical solvent to take off weakly water-soluble components at ambient temperature and pressure. Furthermore, subcritical water is one of the best solvents suitable for cellulose since it has a swelling/expanding effect on the macrofibrils of the cellulose and solubilizes weakly-polar compounds which facilitates the extraction of the components of interest thanks to these modified properties.

The subcritical coordinates of ethanol are under 301° C. and 6.1 MPa (61 bar). The subcritical coordinates of acetone and methanol are respectively under 235° C. and 4.6 MPa (46 bar), and under 239.3° C. and 8.1 MPa (81 bar).

The supercritical coordinates of isopropanol are respectively 5.3 MPa (i.e. 53 bar) and 235° C. The supercritical coordinates of t-butanol are 3.9 MPa (i.e. 39 bar) and 233° C. The use of one or other of these alcohols in supercritical phase is advantageous for the solubilization of the hydrolysis products of lignin which facilitates its subsequent extraction.

The fluid in supercritical or subcritical phase of the extracting step (1) is particularly preferably carbon dioxide ($CO_2$) in supercritical phase, mixed with a mixture of water and ethanol (as cosolvent) in a proportion comprised between 5% water-95% ethanol and 95% water-5% ethanol, preferably between 30% water-70% ethanol and 70% water-30% ethanol, and still more preferably equal to approximately 50% water-50% ethanol (in volume %).

According to a variant of the invention, the extracting step (1) is moreover carried out in the presence of at least one enzyme chosen from the group formed by (or chosen from) laccase, lignin peroxidase (LiP), manganese peroxidase (MnP) and xylanase, said enzyme being present in the fluid in supercritical or subcritical phase. Preferably, said fluid in supercritical or subcritical phase then further comprises at least one catalyst chosen from 2,2'-azino-di(3-ethylbenzothiazolin-6-sulfonic acid) (or ABTS), 1-hydroxybenzotriazole (HBT), N-hydroxyphthalimide (HPI), N-hydroxy-phenylacetamide (NHA), (2,2,6,6-tetramethylpiperidine-1-yl) oxy (TEMPO), violuric acid, and mixtures thereof.

This is then referred to as extraction by enzyme treatment. In this case, the enzyme is used as a catalyst for the extraction, since it facilitates the degradation of the lignin within the material. The enzyme is generally conveyed by a fluid called carrier fluid, which is most often the fluid provided to be put into supercritical or subcritical phase. The enzyme is more generally put in solution. By "solution" is meant the mixture of a solute, which is a chemical constituent in solid, liquid or gaseous form, dissolved in a solvent, which is a liquid chemical constituent. This carrier fluid may itself be transported by another fluid, generally miscible, which may be the fluid provided to be put in supercritical or subcritical phase, which has different characteristics, the ensemble thus forming most often a complex system, for example micellar or biphasic.

The step (1) of extracting by enzyme treatment is generally carried out in a single step, most often by placing the enzyme with the material and by directly introducing the fluid provided to be put into supercritical phase. It is preferred in this case for there have been carried out in advance a step of pre-treating the material in order to prepare it for the enzyme treatment. Without wishing to be bound by any particular theory, the applicant thinks that this pre-treating step serves to flush the air and water from the lignocellulosic material so as to enable better penetration of the enzyme in the later step. Such a prior step may be a pre-treatment step by at least one fluid in supercritical or subcritical phase, in static or dynamic mode, in conditions of pressure from 0.8 to 40 MPa (8 to 400 bar), temperature from 32 to 200° C. and for a duration of 15 min to 72 h.

The enzyme treatment step is generally carried out in the operating conditions of extracting step (1) set out above, one of the important operating parameters being furthermore the nature and the concentration of the enzyme as well as the nature and the concentration of the catalyst if there is one, such as HBT.

The enzyme treatment step enables the extraction of the lignin and of other components that may be dissolved and present in the lignocellulosic material, in the solution containing the enzyme which is recovered at the end of the extraction, whether it be in static mode or in dynamic mode.

It is possible that the partial delignification carried out at extracting step (1) may, although this is not its primary objective, serve to extract, in addition to the lignin, other components of the lignocellulosic material such as the extractives. The amount of lignin extracted from the lignocellulosic material mainly depends on the operating conditions of the treatment (mainly the mode, duration, temperature, pressure, possibly stirring, speed of pressurization and speed of depressurization, possibly in case of presence of an enzyme, the concentration of the enzyme and whether or not a catalyst such as HBT is used). However, it also depends on the nature of the material concerned, depending whether for example it is a softwood, a hardwood or an annual grass.

Thus, if the lignocellulosic material is softwood, it is generally 50 to 85%, preferably 50 to 75%, by weight %, of the lignin present in the structure which is extracted during the extracting step (1). On the other hand, if the lignocellulosic material is hardwood, it is generally 40 to 60%, preferably 45 to 55%, by weight %, of the lignin present in the structure which is extracted during the extracting step (1). The person skilled in the art is capable of adapting how step (1) is carried out according to the structure concerned and the nature of the lignocellulosic material.

In practice, the fluid provided to be placed in supercritical phase is most often introduced into an appropriate reactor, most often a high-pressure cell, which contains the structure of lignocellulosic material, in order to attain the desired conditions of temperature and pressure which will enable that fluid to put in supercritical or subcritical phase.

By "high-pressure cell" is meant according to the invention a cell or vessel which withstands high pressures and temperatures and in which an extraction in supercritical or subcritical phase can be carried out.

The cosolvent, if present, is generally introduced at the same time as the structure of lignocellulosic material in the high-pressure cell when the extracting step (1) is carried out statically.

When the extracting step (1) is carried out in dynamic mode, the cosolvent possibly present is generally continuously introduced into the high-pressure cell in parallel with the continuous introduction of the fluid provided to be put in supercritical or subcritical phase.

At the time of this extracting step (1), the fluid in supercritical phase spreads within the lignocellulosic material and swells and expands the cellulose macrofibrils of the material while partly solubilizing the lignin. This leads to a production of fragments of lignin of low molecular weight and their dissolution in the fluid in supercritical or subcritical phase possibly mixed with the cosolvent. The presence of organic cosolvent (ethanol/water mixture for example in the case of carbon dioxide in supercritical phase) promotes these effects.

At the end of this extracting step (1), the fluid in supercritical or subcritical phase is generally evacuated in controlled manner from the high-pressure cell, typically by means of depressurization that is controlled in order not to damage the structure of the wood, and the extract which contains the lignin is collected. Advantageously, the lignocellulosic material so treated keeps enough lignin to preserve its structure and its chemical, mechanical and optical properties.

The dissolved lignin that is extracted from the structure of lignocellulosic material plays an essential role in the context of the process of the invention. As explained above, other compounds may be dissolved and extracted, or even simply extracted, from the lignocellulosic material during the extracting step (1). According to the process of the invention, the dissolved lignin recovered in the fluid of the extracting step (1) is generally pure since the fluid in supercritical or subcritical phase advantageously preserves the lignin on extraction without modifying it chemically. This dissolved lignin is preferably used in a process for exploiting the lignin, generally industrially, for the manufacture of a construction material, a material used in aeronautics, a packaging material, a biofuel, a pharmaceutical compound and/or, preferably or, a chemical compound. The lignin can thus be used to exploit it in carbon fiber (by aromatic combination), fibrous concrete, packaging, biofuels (by methanization), medicines, and chemical compounds (ferulic acid, in particular) and flavoring agents (vanillin), and moreover for applications of high added value such as the extraction of aromatic molecules as elementary building blocks in various fields of chemistry (polymers, synthesis of precursors, etc.). The lignin may also be used through different pulps (such as kraft, paper pulp, alkaline pulp or sulfite pulp) in the packaging field. This confers the process according to the invention with a character of an "ecological" or "green" process, avoiding as far as possible the production of non-recyclable waste.

It is also possible, under the invention, according to what has been envisioned in the literature, to make use of the lignin extracted from the fluid of the extracting step (1) in fields as varied as:

- biorefinery (combustion products, synthesis gas, bioethanol);
- products of biological chemical specialties (aromatic derivatives such as vanillin, benzene, xylene, DMBQ (2,6-dimethoxy-1,4-benzoquinone), syringaldehyde, syringol, vanillic acid, sinapinic acid, p-hydroxybenzaldehyde, 3-ethylphenol, 2-methylphenol, 3-methoxycatechol, ferulic acid; gases such as carbon dioxide, carbon monoxide, methane or methanol);
- specialty compounds (low-quality carbon fiber or of medium quality for applications such as aerospace, automotive, motorcycles, aircraft, wind turbines, brakes or fishing rods; additives for asphalt, additives for cement; and emulsifying agents); and
- diverse and various materials (plastic products such as phenolic resins, epoxy resins, lignin-polyurethane foams; rubbery products such as lignin-polyurethane elastomer coatings; adhesive products; products for wooden boards of fiber board type; animal nutrition products such as tablets or binders; inflammable products such as matches or liquids for barbecues).

Similarly, the extracted compounds other than the lignin are preferably used in an exploitation process, such as a process for exploiting sugars or aromatic or functional substances, generally industrially. For some of these applications, these extracted compounds must undergo post-treatment steps, such as purification and/or fractionation, prior to their use in said applications.

Optional Intermediate Functionalizing Step

The optional intermediate functionalizing step, situated between the extracting step (1) and the filling step (2), is directed to adjusting the chemical and physical properties, especially the hydrophilic or hydrophobic properties of the delignified lignocellulosic material, with the aim of improving the filling step (2) or even the finishing step (3). As a matter of fact, such functionalizing makes it possible to increase the affinity of the delignified lignocellulosic material for the filling compound, respectively hydrophilic or else hydrophobic, and thereby improves the grafting properties of the filling compound with the compounds of the lignocellulosic material in the filling step (2). Furthermore, the functionalizing generally makes it possible to improve the mechanical properties of the lignocellulosic material and make it less sensitive of the moisture of the surroundings.

The functionalizing step may thus be a step of activating hydroxyl groups or an oxidizing step. By "activation of the hydroxyl groups" is meant here any reaction in the presence of an organic co-reagent having a sufficiently electrophilic function to enable the creation of a C—O bond, between a carbon atom of the co-reagent and an oxygen atom of the hydroxyl group. The functionalizing may also consist in any other treatment suitable for optimizing the action of the filling step (2).

The functionalizing step may be carried out with a conventional approach (that is to say neither in supercritical phase nor in subcritical phase), or else, preferably, in supercritical or subcritical phase. By "conventional approach" is meant a principle use of at least one organic solvent most often by soaking or a bath.

The fluid in supercritical or subcritical phase is generally such that the filling compound is soluble in the fluid in supercritical or subcritical phase.

Thus, the fluid in supercritical or subcritical phase used in the intermediate functionalizing step is preferably chosen from:

- carbon dioxide $CO_2$ in supercritical phase, preferably mixed with at least one polar cosolvent chosen from dioxane, water, methanol, ethanol, acetic acid, acetone and mixtures thereof;
- water in subcritical phase, preferably mixed with at least one base such as ammoniac, lithium hydroxide (LiOH), potassium hydroxide (KOH), calcium hydroxide (Ca(OH)$_2$), sodium carbonate ($Na_2CO_3$), potassium carbonate ($K_2CO_3$) or at least one acid such as formic acid and acetic acid.

The operating conditions for use of these fluids are those indicated for these fluids in the extracting step (1), i.e. that the intermediate step is carried out:

- either using carbon dioxide ($CO_2$) in supercritical phase in dynamic mode or in static mode, for 1 to 72 h, preferably from 2 to 72 h, at a pressure of 8 to 40 MPa (80 to 400 bar), and at a temperature comprised between 35 and 200° C., preferably between 50 and 200° C. In this case, preferably, the stirring is generally from 10 to 100 rpm, the pressurization speed is generally from 0.5 to 1 MPa/min (5 to 10 bar/min), and the depressurization speed is generally from 0.2 to 0.5 MPa/min (2 to 5 bar/min);
- Or using water in subcritical phase in dynamic mode or static mode, for 0.5 to 4 h, at a pressure of 1.2 to 25 MPa (12 to 250 bar), preferably from 1.2 to 20 MPa (12 to 200 bar) and at a temperature comprised between 60 and 180° C. In this case, the stirring is generally from 10 to 100 rpm, the pressurization speed is generally from 0.5 to 1 MPa/min (5 to 10 bar/min), and the depressurization speed is generally from 0.2 to 0.5 MPa/min (2 to 5 bar/min).

Still more preferably, the functionalizing is carried out by a supercritical approach using more particularly carbon dioxide ($CO_2$) in supercritical phase in static or dynamic mode, under a pressure of 8 to 20 MPa (80 to 200 bar), a temperature of 32 to 200° C., while stirring (speed typically 10 to 100 rpm), in the presence or absence of a cosolvent such as ethanol, and for a time of 0.5 to 4 h. In this case, the pressurization speed and the depressurization speed of the fluid are preferably controlled in the functionalizing step: they are then respectively from 0.5 to 1 MPa/min (5 to 10 bar/min) and from 0.2 à 0.5 MPa/min (2 to 5 bar/min).

The esterification and etherification by methylation, carboxymethylation and/or hydroxymethylation of the lignocellulosic material are generally functionalizations according to the invention. Their implementation is accessible to the person skilled in the art.

The esterification may be a reaction of the hydroxyl groups in position C2, C3 and C6 of the cellulose with a halide acid derivative, of bromoisobutyrate bromide type, or else an opening of an anhydride ring such as succinic anhydride, maleic anhydride or glutaric anhydride. The carboxymethylation is a specific case of the reaction of cellulose with an anhydride, such as acetic anhydride, which enables the cellulose to be functionalized by an acetate and thereby to form cellulose acetate.

The etherification may be a reaction of hydroxyl groups of the cellulose with compounds of organic halide type, such as propargyl bromide, trityl chloride or epichlorohydrin. The etherification can also be carried out by opening epoxide groups such as propylene oxide (IUPAC name 2-methyloxirane), 1,2-epoxybutane (IUPAC name 2-ethyloxirane), 1,2-epoxypentane (IUPAC name 2-propyloxirane), 2,3 epoxy (propyl)benzene (IUPAC name (Phenylmethyl)oxirane), trimethylene oxide (IUPAC name oxetane), glycidol (IUPAC name oxiranylmethanol).

Preferably, functionalizing the delignified lignocellulosic material is directed to introducing hydrophilic functions onto the cellulose fibrils, by an oxidizing treatment. This oxidative treatment can be carried out in particular by treatment with ozone, with hydrogen peroxide or with (2,2,6,6-tetramethylpiperidine-1-yl)oxy (or TEMPO), preferably with ozone or with TEMPO, with a conventional, supercritical or subcritical approach.

A preferred case of the functionalizing step is the treatment of the lignocellulosic material arising from the extracting step (1) using ozone in supercritical phase.

In an example embodiment, the ozone in liquid form is evaporated and then condensed at −196° C. in an autoclave, which is then heated gently to ambient temperature (approximately 20° C.) (i.e. typically with a temperature rise of 1° C./min (i.e. 3 h36 min) to 5° C./min (i.e. 43 min). The autoclave which contains the ozone is then supplied by a fluid, for example in the case of $CO_2$, in order to attain a pressure of 1 MPa (10 bar). The $CO_2/O_3$ mixture is then transferred to a high-pressure cell which contains a delignified lignocellulosic material arising from the extracting step (1). The high pressure cell is next pressurized (that is to say placed under pressure) in order to reach the particular working pressure defined beforehand. The high pressure cell is next heated and supplied once again with the fluid provided to be put in supercritical or subcritical phase, for example $CO_2$, to reach the desired pressure and temperature and put said fluid in supercritical or subcritical phase. At the end of this functionalizing step, having a duration of 2 h for example, the high-pressure cell is depressurized (that is to say it is brought back to ambient atmosphere), which enables the delignified material so treated to be recovered.

Filling Step (2)

The filling step (2) is a step during which the filling of the structure that is partially delignified or partially delignified and possibly functionalized by the filling compound is carried out, that is to say that the filling compound is made to penetrate the structure that is partially delignified or partially delignified and possibly functionalized.

It may be carried out in one or more sub-steps. The filling compound must most often have the property of linking to the fibers of the lignocellulosic material still present within the structure, by chemical or physico-chemical anchorage.

The filling step (2) may be carried out in at least one series of at least two successive sub-steps, each sub-step being carried out by filling, for example by the same fluid or by a different fluid per sub-step, or by progressive increase in the concentrations of filling compound in the same fluid during the sub-steps.

The settling of the conditions for filling is within the capability of the person skilled in the art.

The filling step (2) may be carried out by injection of the filling compound with a vacuum or under pressure by a technique of RTM type (RTM standing for "Resin Transfer Molding") or RTM Light, by infusion of the filling compound by a RIFT type technique (RIFT standing for "Resin Infusion under Flexible Tooling"), by a process under vacuum or under pressure or by a process using a supercritical phase in a reactor, autoclave or oven under a vacuum or by soaking in a tank or any other apparatus which the person skilled in the art knows is suitable for this step.

It may be recommended to alternate at least one sub-step of phase under vacuum with at least one sub-step of phase under pressure for good impregnation of the lignocellulosic material. Indeed, this alternation promotes the penetration of the filling compound within material on account of the pressure difference so created.

According to an embodiment according to the invention that is particularly preferred, the filling step (2) is carried out by virtue of a fluid in supercritical or subcritical phase, which may comprise a cosolvent as explained at step (1). In this case, the term "impregnation" is used rather than filling. In this case, the filling step (2) is generally carried out in a high-pressure cell in the presence of at least one fluid in supercritical or subcritical phase in which the filling compound is solubilized.

The fluid in supercritical or subcritical phase may be chosen from the fluids used according to the extracting step (1). However, here, an important parameter is the solubility of the filling compound in the fluid in supercritical or subcritical phase.

Thus, the fluid in supercritical or subcritical phase used in step (2) is preferably chosen from:
- carbon dioxide $CO_2$ in supercritical phase, preferably mixed with at least one polar cosolvent chosen from dioxane, water, methanol, ethanol, acetic acid, acetone and mixtures thereof;
- at least one alcohol in supercritical phase, said alcohol being chosen from t-butanol (or tert-butanol, IUPAC name 2-methylpropan-2-ol) and isopropanol (IUPAC name propan-2-ol);
- ethanol, acetone or methanol in subcritical phase, preferably mixed with water as cosolvent, preferably in a small amount;
- water in subcritical phase, preferably mixed with at least one base such as ammoniac, lithium hydroxide (LiOH), potassium hydroxide (KOH), calcium hydroxide (Ca(OH)$_2$), sodium carbonate ($Na_2CO_3$), potassium carbonate ($K_2CO_3$) or at least one acid such as formic acid and acetic acid.

The cosolvent may, and preferably should, be present, as indicated above, in the fluid in supercritical or subcritical phase. However, it may be introduced into the reactor for implementation of the filling step independently of the fluid that is to be put in supercritical phase. It may also be introduced simultaneously or mixed with the fluid that is to be put in supercritical phase.

The operating conditions for use of these fluids are generally the following:
- either using carbon dioxide ($CO_2$) in supercritical phase in dynamic mode or in static mode, for 2 to 72 h, at a pressure of 8 to 40 MPa (80 to 400 bar), and at a temperature comprised between 50 and 200° C. In this case, preferably, the stirring is generally from 10 to 100 rpm ("rpm" standing for "revolutions per minute"), the pressurization speed is generally from 0.5 to 1 MPa/min (5 to 10 bar/min), and the depressurization speed is generally from 0.2 to 0.5 MPa/min (2 to 5 bar/min);
- Or using water in subcritical phase in dynamic mode or static mode, for 0.5 to 4 h, at a pressure of 1.2 to 25 MPa (12 to 250 bar), and at a temperature comprised between 60 and 180° C. In this case, the stirring is generally from 10 to 100 rpm, the pressurization speed is generally from 0.5 to 1 MPa/min (5 to 10 bar/min), and the depressurization speed is generally from 0.2 to 0.5 MPa/min (2 to 5 bar/min).
- Or using ethanol, acetone or methanol in subcritical phase in dynamic mode or static mode, for 0.5 to 4 h, at a pressure of 0.5 to 4.5 MPa (5 to 45 bar), and at a temperature comprised between 40 and 230° C. In this case, the stirring is generally from 10 to 100 rpm, the pressurization speed is generally from 0.5 to 1 MPa/min (5 to 10 bar/min), and the depressurization speed is generally from 0.2 to 0.5 MPa/min (2 to 5 bar/min).

Or using isopropanol or t-butanol in supercritical phase in dynamic mode or in static mode, for 0.5 to 8 h, at a pressure of 4 to 8 MPa (40 to 80 bar), and at a temperature comprised between 185 and 275° C. In this case, the stirring is generally from 10 to 100 rpm, the pressurization speed is generally from 0.5 to 1 MPa/min (5 to 10 bar/min), and the depressurization speed is generally from 0.2 to 0.5 MPa/min (2 to 5 bar/min).

Still more preferably, the filling step (2) is carried out by a supercritical approach using more particularly carbon dioxide ($CO_2$) in supercritical phase in conditions of pressure of 8 to 40 MPa (80 to 400 bar), of temperature of 32 to 200° C., while stirring (speed typically 10 to 100 rpm), in the presence or absence of a cosolvent such as water or ethanol. In this case, the pressurization speed and the depressurization speed of the fluid are preferably controlled in the filling step (2): they are then respectively from 0.5 to 1 MPa/min (5 to 10 bar/min) and from 0.2 à 0.5 MPa/min (2 to 5 bar/min).

According to a particularly preferred embodiment, the filling step (2) is carried out in the presence of at least one fluid in supercritical or subcritical phase in which the filling compound is solubilized. Thus, the partially delignified and possibly functionalized structure of lignocellulosic material is impregnated with this mixture of fluids. For this, a given volume of filling compound is used in order to ensure the filling of the structure in an autoclave. This volume is determined by taking into account the removal of the oxygen present in the cavities of the lignocellulosic material and the possible transformation of the component in case of placing under a vacuum and/or heating.

According to one of the embodiments which will be explained in the examples, a fluid provided to be placed in supercritical or subcritical phase is introduced into a vessel of saturator type in which there is introduced beforehand at least one filling compound, in order to later solubilize the filling compound under operating conditions in which the fluid is in supercritical or subcritical phase.

By "saturator" is meant according to the invention a cell (or reactor) which withstands quite high pressures and temperatures and which makes it possible to fully solubilize a substrate (such as a cosolvent for example) in a fluid in supercritical or subcritical phase.

The fluid in supercritical or subcritical phase is then introduced into a high pressure cell which in advance contains a delignified structure of lignocellulosic material and the filling compound so as to carry out the filling step (2) (which in this case is impregnation) of the structure partially delignified in the liquid copolymer or polymer.

The filling step (2) of the treatment process according to the invention may be carried out generally according to two embodiments, explained below, each of these two modes preferably being carried out in the presence of a fluid in supercritical or subcritical phase. These two embodiments may be adapted according to the lignocellulosic material used.

Thus, according to a first embodiment of the filling step (2), the filling compound is a polymer or a copolymer, which may or may not be formulated, most often, prior to placing in contact with the structure of lignocellulosic material, deposited in a vessel of saturator type to promote its solubilization in the fluid provided to be put in supercritical or subcritical phase.

It is preferable to employ a thermoplastic polymer or copolymer, in which case the temperature of the filling step (2) is generally greater than the glass transition temperature of that polymer or copolymer. In this case, the subsequent finishing step (3) will consist of putting to rest at a temperature less than the glass transition temperature of the polymer or co-polymer. This assumes that the polymer or copolymer has a glass transition temperature greater than the temperature of the finishing step (3).

Preferably the polymer or co-polymer is chosen from the group formed by polyacrylates, polyamides (such as Nylons® from DuPont), polyesters, fluoropolymers (such as Teflon® from DuPont), polyethylene, polypropylene, polybutene, polystyrene, poly(phenylene oxide), poly(vinyl chloride), poly(vinylidene chloride), polycarbonate, poly(lactic acid), polyethersulfones, polyetherimides, polyaryletherketones, inorganic or organic sol-gel materials such as Ormosil polymers (Ormosil standing for "organically modified silica" or "organically modified silicates"), silicones, and combinations thereof; as well as from the group formed by the polymers and copolymers, not listed above and obtained from the monomers of the second embodiment for which the list is given below.

Cellulose, starch, polypeptides, proteins, as well as polymers derived from these compounds, such as cellulose acetate, starch acetate, whether or not formulated, may be used in this embodiment.

The filling compound of filling step (2) may also be a vitrimer, generally obtained from thermosetting polymers (such as epoxy) and/or from thermoplastic polymers (such as poly(methyl methacrylate), polystyrene or high density polyethylene.

According to the invention, it is considered that a vitrimer is a polymer, forming part of the first embodiment of the filling step (2).

By "vitrimer" is meant according to the invention a new category of organic material which may be qualified as a polymer. Thus, a vitrimer is a polymer that is light and strong which, once hardened, may be remelted and remolded like glass while presenting superior mechanical properties to those of glass. It thus combines the qualities of thermoplastics (which may be melted and remolded and thus recycled) and those of thermosetting compounds which have good mechanical, chemical and thermal properties, but which cannot be re-used. Vitrimers may be synthesized for example by reactions of metathesis between dioxaborolanes (compounds containing one atom of boron linked to 2 atoms of oxygen) and polymers (such as poly(methyl methacrylate) or polystyrene) solely containing carbon-carbon chemical bonds in their skeleton without addition of catalyst at moderate temperatures of the order of 60° C.

This reaction is generally fast and efficient, the compounds obtained having chemical, mechanical and thermal properties superior to the starting polymers. It requires no catalyst, which constitutes a real economic and ecological advantage.

By "metathesis" is meant changes to bonds between atoms leading in formal terms to chemical compounds in which the bonds of the different types are practically the same in number and of the same nature as in the starting compounds.

According to the second embodiment of the filling step (2), the filling compound of filling step (2) is a polymerizable monomer present in a monomeric solution or in a monomeric formulation under the conditions of pressure and temperature of the filling step (2).

Preferably, the filling compound of the filling step (2), is a monomer present in a monomeric solution polymerizable at the conditions of pressure and temperature of the filling step (2), the monomer solution further comprising at least one catalyst. Such a polymerizable monomer generally leads to the obtaining of a thermoplastic (polymer) or a thermosetting (polymer).

The filling compounds may thus comprise monomers, in the form of monomeric solutions or even monomeric formulations. The monomeric formulations and solutions may be commercially available products known to the person skilled in the art.

In general terms, it is recommended to avoid the use of a filling compound that has the associated risk of generating sub-products that are volatile or not linked to the structure of the composite material.

By "monomeric solution" is meant a mixture of one or more monomers, with or without an agent activating the polymerization of those monomers.

Particularly preferably, the filling step (2) is carried out in the presence of a fluid in supercritical or subcritical phase in which is solubilized a monomeric solution comprising the filling compound. Thus, the partially delignified and possibly functionalized structure of lignocellulosic material is impregnated with these fluids.

By "monomeric formulation" is meant a monomeric solution containing at least one additional compound. Such an additional compound is generally chosen from oligomers, polymers, copolymers as regards the thermoplastics, or the pre-polymers and the pre-copolymers accompanied by at least one hardener for the thermosetting plastics. This additional compound may also be an agent that enables polymerization such as an initiator (for example a bio-sourced initiator such as epichlorohydrin, carboxylic acids, amines, and mixtures thereof), a catalyst, preferably able to be heat-activated or degradable by radiation, a filler, a surfactant, a polymerization inhibitor or retardant, a chain transfer agent, or a mixture of these compounds.

Most often, the filler, if present, is organic or mineral. The mineral filler is generally chosen from the group formed by aluminas, clays, carbon powders, glass beads, diamonds, gypsum, calcium carbonate, mica, perlite, quartz, sand, talc, silica, titanium and mixtures thereof, preferably chosen from the group formed by clays, diamonds, glass beads, gypsum, calcium carbonate, mica, perlite, quartz, sand, talc and mixtures thereof. The mineral filler may be functionalized to increase its dispersion and its stability in the monomeric filling formulation. At least one surfactant may be added for this purpose too.

The catalyst is chosen so as preferably to catalyze a radical polymerization reaction. As is known to the person skilled in the art, this choice is generally dependent upon the mode of polymerization and its control, in addition to the monomer.

The catalyst is preferably chosen from the group formed by the compounds of azo type of formula R—N=N—R' where R and R' are alkyl groups possibly comprising at least one additional function, such as azobisisobutyronitrile, peroxides, alkyl (generally comprising from 1 to 6 carbon atoms per molecule) halogenated (that is to say comprising a halogen atom which is chlorine, bromine, iodine or fluorine) compounds, nitroxides, thiocarbonyl-thio compounds and mixtures thereof. However, any other catalyst known to the person skilled in the art may also be envisioned, such as ketone peroxide, hydrogen peroxide, peroxycetal, hydroperoxide, dialkyl peroxide, diacyl peroxide, peroxyesters, peroxy dicarbonates, such as benzoyl peroxide, methyl ethyl ketone peroxide, cumene hydroperoxide, potassium persulfate, tert-butyl peroxyneodecanoate, tert-butyl peroxypivalate, tert-butyl peroxy-2-ethylhexanoate, tert-butyl peroxyisobutyrate, 1,1-bis-tert-butylperoxy-3,3,5-trimethylcyclohexane, tert-butyl peroxylaurate, tert-butyl peroxyisophthalate, tert-butyl peroxyacetate, tert-butyl peroxybenzoate, dicumyl peroxide, di-tert-butyl peroxide and mixtures thereof.

According to this second embodiment of the filling step (2), the monomeric solution or the monomeric formulation of the filling step (2) may furthermore comprise at least one plasticizer which may be a solvent, an oligomer or even a filler directed to reducing the viscosity of the filling compound and thereby enable better penetration of the filling compound within the lignocellulosic structure of the material.

If the plasticizer is a solvent, this is generally chosen such that it evaporates in large part at ambient temperature so as to limit the emission of the organic compound during the lifetime of the composite material structure. More particularly, the use of monomeric solution or monomeric formulation containing a solvent of low volatility is not preferred, in the context of the present invention in that the impregnation of a solvent within the structure of the lignocellulosic material may lead to the creation of non-grafted molecules that are imprisoned in the composite material structure which could be progressively released. If the plasticizer is an oligomer, this is chosen such that it anchors lastingly in terms of the structure so as to avoid any later discharge.

At least one agent for preserving the structure of the final composite material, such as an absorber of UV radiation, may also be added to the monomeric filling formulation. This enables the robustness of the latter in the structure to be improved. Such an agent may be chosen from among the chromophore compounds such as anthraquinone, compounds based on the benzophenone or benzotriazole unit, the diphenyl acrylate unit, or all or some of the compounds extracted during the extracting step (1), and mixtures thereof.

At least one compound that is fire-retardant, fungicidal, bactericidal, or insecticidal may also be added in order to reinforce the properties of the final composite material structure. The fire-retardant compounds comprise aluminum trihydrate, antimony trioxide, antimony pentoxide and organophosphorus compounds, and all or some of the compounds extracted during extraction (1), and mixtures thereof.

The monomeric filling formulation may further comprise at least one polarizing agent chosen from the group formed by ethanol, ethylene glycol, methyl ether, N-methyl pyrrolidone, dioxanes, dimethylformamide, diethylene glycol, diethylene glycol dimethyl ether, pyridine, n-butylamine, piperidine, morpholine, 4-picoline, 2-picoline, diethylamine, aniline, acetone, and methanol.

The presence of such a polarizing agent advantageously enables better penetration of the filling compound within the lignocellulosic structure, as well as swelling of the lignocellulosic matrix. More particularly, the presence of these polarizing agents disturbs the hydrogen bonds of the cellulose and thereby swells/expands the macrofibrils of the cellulose which leads to better dissemination of the filling compound.

The monomer may be and is preferably chosen from the monomers produced from petroleum (called petroleum-sourced) among which are the methacrylates, such as ethyl methacrylate, methyl methacrylate, propyl methacrylate, butyl methacrylate, hexyl methacrylate, octyl methacrylate, lauryl methacrylate, 2-ethylhexyl methacrylate, cyclohexyl methacrylate, glycidyl methacrylate; acrylates such as ethyl acrylate; phthalates such as dialkylphthalates wherein the alkyl comprises for example from 1 to 6 carbon atoms; nitriles such as acrylonitrile; styrene and styrene derivatives such as α-methylstyrene, chlorostyrene, styrene, tert-butyl styrene, vinyl toluene; vinyl compounds such as vinyl acetate, vinyl chloride and vinyl propionate; unsaturated compounds containing a carboxyl group such as acrylic acid, fumaric acid, maleic acid, methacrylic acid; ethylene compounds such as ethylene glycol or ethylene oxide; butadiene; isoprene; unsaturated monomers containing a nitrogen atom, such as acrylamide, acrylonitrile, N-butoxydimethylacrylamide, vinylpyridine; and mixtures thereof. These monomers generally lead to the formation of thermoplastic polymers.

We may also cite monomers leading to the formation of thermosetting polymers such as petroleum-sourced compounds among which are precursors of thermosetting resins such as precursors of epoxy resins, such as the pre-polymer epoxide derivatives of bisphenol such as diglycidyl ether of bisphenol A (DGEBA), or any bisphenol epoxide, as well as glycidyl methacrylate or allyl glycidyl ether, the precursors of oxetane resins, the precursors of phenolic resins, the precursors of urea resins, the precursors of urethan resins, the precursors of acrylic resins; and mixtures thereof. In this case, at least one hardener is generally present in the filling compound. The hardener may be any hardener of thermosetting resin known to the person skilled in the art such as an aliphatic amine, like isophorone diamine, or cyclic amine, a carboxylic acid, an anhydride or an ionic liquid.

We may also cite bio-sourced monomers leading to the formation of thermoplastic or thermosetting polymers, identical to the monomers produced from petroleum or different, among which are the tannins, such as flavan-3-ol (afzelechin, gallocatechin, catechin) and the terpenes; resveratrol; resorcinol; glycerol and glycerol derivatives such as epichlorohydrin, isomers of propanediol and glycolic acid; sugar derivatives (isosorbide, sorbitol polyglycidyl ether, trehalose, D-glyceraldehyde, D-threose, D-erythrose, D-arabinose, D-ribose, D-mannose, D-glucose); furfural derivatives (generally resulting from the acidic depolymerization of hemicellulose); derivatives of maleic or fumaric acid; lactic and formic acid derivatives; the monomers produced from vegetable oil and fat (cashew nut, safflower, rapeseed, linseed, olive, soya, castor oil) such as sebacic acid (castor), cardanol (cashew nut), linoleic acid (produced from linseed), vernolic acid (produced from vernonia seeds); hydroxyalkanoic acids, such as those derived from formic, lactic and sebacic acids; bio-ethylene (or biological ethylene); bio-ethylene glycol (or biological ethylene glycol); bio-propylene (or biological propylene); bio-1,4-butanediol (or biological 1,4 butanediol); the derivatives of lignin such as terephthalic acid, gallic acid, vanillin; the derivatives of vanillin such as vanillylamine, diglycidyl ether methoxyhydroquinone, triglycidyl ether of vanillylamine; and mixtures thereof, such as monomers resulting from a combination of derivatives of sugar and fat. By "bio-sourced" it is meant to qualify a substance of which all or some of the constituent atoms, that is to say from 10 to 90%, preferably from 10 à 30%, are produced from a resource coming from biomass, and are not the result of anthropic transformation of a fossil resource.

Mention may also be made of hybrid bio-sourced monomers leading to the formation of thermoplastic or thermosetting polymers, identical to the bio-sourced monomers. By "hybrid bio-sourced" compound is meant a bio-sourced compound of which some of the structure has reacted with a molecule of which the atoms do not come from resources produced from biomass.

By "derivative of X", is meant according to the invention a compound synthesized from compound X by a short sequence of chemical reactions substantially keeping the identity (that is to say the main chemical structure) of compound X, such as an addition of a function or an increase in the length of the carbon chain (i.e. an addition of carbon chain) or an oxidation or a reduction or a nucleophilic substitution or ring-opening.

Still more preferably, the monomeric solution or monomeric formulation, preferably the monomeric solution, filling step (2) comprises at least one monomer chosen from:
  monomers produced from petroleum among which are methacrylates, such as butyl methacrylate, methyl methacrylate, ethyl methacrylate, glycidyl methacrylate, tri-n-butyl tin methacrylate; phthalates such as dialkylphthalates; nitriles such as acrylonitrile; styrene and styrenic derivatives such as tert-butyl styrene and chlorostyrene; vinyl compounds such as vinyl acetate, vinyl chloride and vinyl propionate; ethylenic compounds such as ethylene glycol or ethylene oxide; butadiene; isoprene; and mixtures thereof; and
  bio-sourced monomers among which are terpenes; glycerol and glycerol derivatives most often obtained after reaction with at least one of epichlorohydrin, isomers of propanediol and glycolic acid; derivatives of sugars; furfural derivatives (generally resulting from the acidic depolymerization of hemicelluloses); lactic and formic acid derivatives; monomers produced from castor oil such as sebacic acid; hydroxyalkanoic acids, such as those produced from formic, lactic and sebacic acids; bio-ethylene (or biological ethylene); bio-ethylene glycol (or biological ethylene glycol); bio-propylene (or biological propylene); bio-1,4-butanediol (or biological 1.4-butanediol); lignin derivatives, such as terephthalic acid; and mixtures thereof.
and mixtures thereof.

The advantage of using bio-sourced monomers, in particular if they are biodegradable, is that it is possible either to recover them later, on recycling the composite material at the end of life, or to facilitate the destruction of the composite material at the end of life. This thus makes it possible to obtain a partially or totally recyclable composite, which confers the process according to the invention a character of a sustainable or even "ecological" ("green") process.

According to a variant of the second embodiment of the filling step (2), the filling compound is constituted by two monomers conveyed within the lignocellulosic material for example by a fluid in supercritical or subcritical phase. These monomers lead to the manufacture of a thermosetting polymer in the finishing step (3), which in this case consists of polymerization and cross-linking.

A second embodiment example is for the filling step (2) to comprise a possible step of adding a cosolvent (for example ethanol, preferably 50% monomer-50% ethanol) to a fluid in supercritical or subcritical phase in a saturator, in which is present a monomeric solution. This fluid/cosolvent/monomer mixture is next introduced into a high pressure cell which contains a structure of lignocellulosic material deposited on a porous support such as a sintered member. The fluid phase solubilizes the monomeric solution and that fluid phase containing the monomer or monomers disseminates within the delignified structure of lignocellulosic material, which expands/swells. The affinity between the monomers and the lignocellulosic material promotes the impregnation and the molecular dispersion of the monomer or monomers within the lignocellulosic material. A high partition coefficient is preferred, which has a high affinity between the monomer or monomers and the lignocellulosic material.

At the end of this impregnation step, the high pressure cell is depressurized slowly using a depressurization valve and collection is made of the lignocellulosic material thus filled (or impregnated), with the monomer or monomers in homogenous manner while maintaining its structure and its properties.

According to a variant of the second embodiment of the filling step (2), the monomer or monomers are such that once the polymerization has been carried out, the polymer has substantially the same optical density as that of the cellulose.

The refractive index of the polymer so obtained is typically comprised within a range of from 1.35 to 1.70, more particularly between 1.44 and 1.65, and still more particularly between 1.52 and 1.60, and often taken around 1.47, 1.53, 1.56 or 1.59, with a possible variation around these values of the order of 10%. It may also be, in a different embodiment, typically comprised within a range of from 1.40 to 1.60, for example approximately 1.47.

Finishing Step (3)

The finishing step (3) is a step during which the filling compound of the filled partially delignified structure resulting from the filling step (2) is fixed in the structure, which makes it possible to obtain a composite material structure formed from a three-dimensional network of transformed filling compound incorporated into a network of cellulose and lignin. The "transformed filling compound" is the compound obtained as a result of the finishing step (3).

This step is carried out in different ways, in particular according to the embodiment of the filling step (2) (first or second embodiment). It may be performed in one or more sub-steps. It may be carried out in a stationary mode or by stages.

This finishing step (3) is thus a step of fixation of the filling compound, preferably by polymerization and/or cross-linking when the filling compound comprises at least one monomer, often present in the form of a filling solution or formulation. This polymerization and/or cross-linking is carried out in particular in such a way that the fibers of the lignocellulosic material are linked to the transformed filling compound after completion of the finishing step (3) by chemical, physical or physico-chemical anchorage. The person skilled in the art is capable of determining the formulation of the filling solution to obtain the desired anchorage in the finishing step.

When the filling compound is a polymer (including a vitrimer), this finishing step simply consists of the collection of the filled material resulting from the filling step (2), in conditions of atmospheric pressure and ambient temperature.

As explained previously the term "anchorage" relates to the creation of molecular links. The structuring of polymer chains within the architecture of the lignocellulosic material is made either by covalent bonds, in which case a chemically cross-linked network is obtained, or by weak links, of hydrogen bond or van der Waals type, in which case a physical network is obtained, or else by a mixture of the two types of bond.

The filling compound thus forms a polymer which may thus belong to the family of the thermoplastic polymers or the thermosetting polymers. Such polymers may be chosen from the group formed by acrylic resins, aminoplast resins, diallyl phthalate resins, epoxy resins such as Spurr's epoxy resins (for example such as the commercially available product EM300 sold by the Sigma-Aldrich company), melamine resins, methacrylic resins, oxetane resins, phenolic resins, polyacetal resins, polyamide resins, aromatic and aliphatic polycarbonate resins, aromatic and aliphatic polyesters, polyfluorinated resins, polyphenylene ether resins, polyimide resins, aromatic and aliphatic polyolefin resins, polysulphonated resins, styrenic resins, and polyurethanes, and combinations thereof.

The anchorage of the filling compound is carried out in different ways, in particular according to the embodiment of the filling step (2).

Thus, when the filling step (2) is carried out according to its first embodiment, that is to say that the filling compound is a polymer or a copolymer which is preferably thermoplastic or a vitrimer, the finishing step (3) consists of fixation (or fixing), as well as possible, of the polymer or copolymer or vitrimer within the structure for its later use. In other words, the finishing step (3) consists of placing said polymer or copolymer or vitrimer in a physical state in which it is practically unable to leave the structure in the conditions of temperature and pressure considered. These conditions of temperature and pressure depend substantially on the later use which will be made of the composite material structure, i.e. typically whether it is intended for exterior placement (in which case the climate of the location of use must be taken into consideration) or interior placement. In general, this results in placing under a temperature lower than the vitreous transition temperature of the polymer or copolymer.

Thus, when the filling step (2) is carried out according to its second embodiment, that is to say that the filling compound is a polymerizable monomer present in a monomeric solution, the finishing step (3) consists of polymerizing the monomer in the presence of the catalyst. This is generally carried out by any polymerization technique that can be envisioned, such as the thermal route, the UV route, or the plasma route. The technical choice depends substantially on the nature of the polymerization catalyst, as is known to the person skilled in the art.

For example, the monomeric solution comprises butyl methacrylate and styrene in a proportion of one part butyl methacrylate for 3 parts of styrene, and the catalyst present at the finishing step (3) is azobisisobutyronitrile in a ratio of 0.05 part. In this case, the finishing step (3) may be carried out by heating at a temperature of 15° to 80° C., for example 40° C., under a vacuum or under an oxygen-free atmosphere, or else under an oxygen-free atmosphere, for 20 to 50 hours, for approximately 24 hours.

When the polymer or copolymer obtained is a thermosetting polymer or copolymer, the filling step (2) is carried out at the liquid state at a temperature greater than the range of temperatures at which the cross-linking is established and said polymer or copolymer begins to harden. Thus, the finishing step (3) consists of polymerization then cross-linking of the source monomers of the thermosetting polymer, at a temperature less than said range of temperatures of the polymer or copolymer.

Thus, it is possible to perform the filling step (2) of the lignocellulosic material and to initiate the finishing step (3), which is a precipitation of the filling compound therein, practically simultaneously.

Optional Steps of Post-Treatment (4) and/or (5)

According to the invention, the treatment process may furthermore comprise a step of placing under pressure (4) of the structure produced from the finishing step (3). The step of placing under pressure (4) is typically carried out at a temperature of 50 to 250° C., preferably of 80 to 250° C. for 5 to 30 minutes under pressure of 0.1 to 2.0 MPa (1 to 20 bar).

This step of placing under pressure (4) may be followed by a step of surface finishing (or surface treatment) (5) of the structure resulting from the step of placing under pressure (4) The surface finishing step (5) may typically be carried out by the chemical route, for example by means of ethyl acetate, or by the thermal route accompanied by placing under a press, in which case the steps of placing under pressure (4) and surface finishing (5) are carried out simultaneously. This advantageously makes it possible to flatten the surface irregularities of the structure.

The surface finishing step (5) can also be carried out without carrying out a step (4). beforehand. In this case, it may be carried out on the basis of vapor treatment with acetone or methylene chloride.

Structure

The composite material structure obtained by the process according to the invention is generally advantageously a structure having good fire-resistance, that is increased relative to the lignocellulosic material before treatment (on account of its increased mass per unit volume and the absence of air—and thus of oxygen—in its densified cellular structure), rot-proof (on account of the absence of air in the densified cell structure which cannot therefore interact with the ambient moisture), of improved durability relative to the lignocellulosic material prior to treatment, and which has mechanical properties of resistance to compression and bending that are improved relative to the native lignocellulosic material prior to treatment. Among other things, these properties depend on the nature of the filling compound and on the native lignocellulosic material.

According to a preferred embodiment, the composite material structure has in major part, or even in its entirety, a substantially homogenous or periodic refractive index, according to the nature of the native lignocellulosic material.

According to an embodiment, the composite structure of lignocellulosic material is substantially transparent. However, it may also be opaque. Preferably, the composite structure of lignocellulosic material is substantially translucent.

By "transparent" is meant the capacity of a visually homogenous body to allow at least 90% of incident light to pass through. This measurement is made relative to the transmission of direct light for an ambient illumination considered, by comparison with the value (in lux) of the ambient illumination and the value (in lux) of the luminous transmission flux obtained after passage inside the structure.

By "translucent" is meant the capacity of a body to allow between 5% and 90% of the incident light to pass through. It is possible for a translucent body not to appear homogenous. In the context of the present invention, certain less delignified zones of the part of lignocellulosic material may absorb the incident light rays according to the structure of the native lignocellulosic material; the zones that are most delignified will, on the other hand, tend to appear lighter and to allow light to pass more easily than the less-delignified zones.

By "opaque" is meant the capacity of a body not to allow any light ray to pass, by absorption or by diffusion of the light inside its structure. A structure of native lignocellulosic material is generally an opaque material in its commonly used sizes. If the thickness of this structure is reduced to less than 500 µm, the native lignocellulosic material is then in its fragile flexible sheet form, and may allow incident radiation to pass, and may be translucent thereby, despite the absence of treatment, but the material does not have the other properties of the final composite material.

The light rays passing through the material may or may not be deviated, and may or may not maintain their direction of initial propagation after having passed through the structure. This optical property is advantageously obtained by homogenizing the optical index of the transformed filling compound with that of the cellulose (in particular the alpha-cellulose) determined within the structure of the lignocellulosic material on account of the filling step (2) and by creation of a continuum of material in the finishing step (3). This procures an additional optical quality for the structure, since all or some of an incident radiation may be transmitted through this composite material structure by homogenization of the optical density.

The continuity of the optical indexes is generally not perfect above a certain volume of structure of lignocellulosic material. To be precise, according to the native lignocellulosic material and the degree of delignification, the extraction of the lignin from the lignocellulosic material may not be uniform depending on its faces and at depth, such that the delignification, and therefore the optical rendition, does not appear to be homogenous. For example, in the case of wood treatment, according to the kinds of wood, the zones of summer wood and spring wood may not have the same nature or not be differentiated. The same applies for the sapwood and the heartwood for certain kinds of wood. It is thus possible, for certain woods, in particular those having annual growth rings (alternation of summer and spring wood), that one of the parts, often the summer wood, is less prompt to undergo the treatment of the extracting step (1), thereby leaving zones apparent after treatment by steps (2) and (3) having a greater or lesser degree of translucency, or even that are opaque. On the contrary, as regards more fragile kinds of wood that are generally chemically homogenous, the reactivity of the structure confronted with step (1) may be substantially homogeneous rendering the material substantially uniformly translucent or transparent. The optical property is generally observed on the composite material structure.

Typically, the composite material structure comprises at least one dimension of at least 2 mm and at most 40 cm. These 40 cm may correspond to the total thickness of a CLT board. It is possible that this may not strictly correspond to the dimensions of the structure before treatment according to the process of the invention. To be precise, dimensional changes may result from the process by a modification of the structure of the lignocellulosic material during step (1), for example bringing deformation (slight twisting) or a reduction in the size of the composite material relative to the lignocellulosic material before treatment, with or without a deformation axis having precedence.

The structure of the composite material often has a higher density than that of the native lignocellulosic material, for example from 5% to 1000% greater, preferably between 10 to 200% greater, this value depending in particular on the lignocellulosic material, the degree of delignification and the nature of the filling compound.

The composite material structure obtained according to the process of the invention is preferably a trimming member, a finishing member or a structure member.

It is to be recalled that there are three types of cut in wood:
LRC (longitudinal radial cut)
TC (transverse cut)
TLC (tangential longitudinal cut).

The different types of possible cuts cited above were treated according to the invention, even though the following examples only concern the TC and TLC cuts.

It is to be noted that according to the invention, the transverse and longitudinal cuts, which are the preferred cuts, generally react in similar manner to the process.

The choice of cut which must be preferred and be treated according to the invention is made by the person skilled in the art according to the desired application: by way of example, for structural applications taking advantage of the improved mechanical properties, the LRC will be preferred whereas for applications taking advantage of the new optical properties it will be the TC to be preferred.

Part

The part comprising the structure obtained according to the process of the invention may be used in a wide variety of exterior uses, in which case the part is generally chosen from among soffits, window frames, doors and door frames, verandahs, edging planks, garden sheds, terraces (such as exterior decking and exterior pavements) and buildings with wood panels (or wood cladding), urban developments and the like. Alternatively, the part may be used in a wide variety of interior uses, in which case the part is generally chosen from among packaging components for luxury goods, shaping (or design) components, furnishing components (such as furniture and joinery products or even food containers such as food bowls), automotive interior components, interior components for yachts and jets, marine components, sports components (such as skis), components of mass-market goods (such as sunglasses or telephone covers), aeronautical components, and components for the construction sector.

DRAWINGS

The invention will be better understood in the light of the accompanying drawings.

FIG. 1 diagrammatically represents the process for treating a structure of lignocellulosic material according to the invention, by a succession of sub-steps, each being represented by a box. The boxes are linked together by arrows indicating the passage from one step to the next. Each of the boxes corresponds to the step bearing the same reference number of the process according to the invention, it being understood that references 4 and 5 are optional steps as shown by the arrows in dashed line linking the boxes together. In order, there can thus be distinguished a first extracting step 1 performed on the structure of lignocellulosic material. Step 1 achieves partial dissolution of the lignin in the fluid phase and subsequent evacuation from that structure, in the amounts indicated.

This extracting step 1 may be followed by an intermediate optional step 14 of functionalizing the lignocellulosic material resulting from the extracting step 1. Two alternatives are thus represented: passage from 1 to 2 directly which leads to a partially delignified structure, or passage from 1 to 2 indirectly, that is to say passage from 1 to 14 then from 14 to 2, which leads to a partially delignified and functionalized structure The structure which is partially delignified and possibly functionalized resulting from either the extracting step 1, or from the intermediate step of functionalizing 14, is then filled (or impregnated) by at least one filling compound in a filling step 2.

The following step is a step of fixation 3 of the filling compound within the structure resulting from the filling step 2. This makes it possible to obtain a composite material structure formed by a three-dimensional network of transformed filling compound incorporated in a network of cellulose and lignin. This step 3 may be followed by a step of placing under pressure 4 of the structure resulting from the finishing step 3, possibly itself followed by a step of surface finishing 5 of the structure resulting from step 4.

Figure 2:
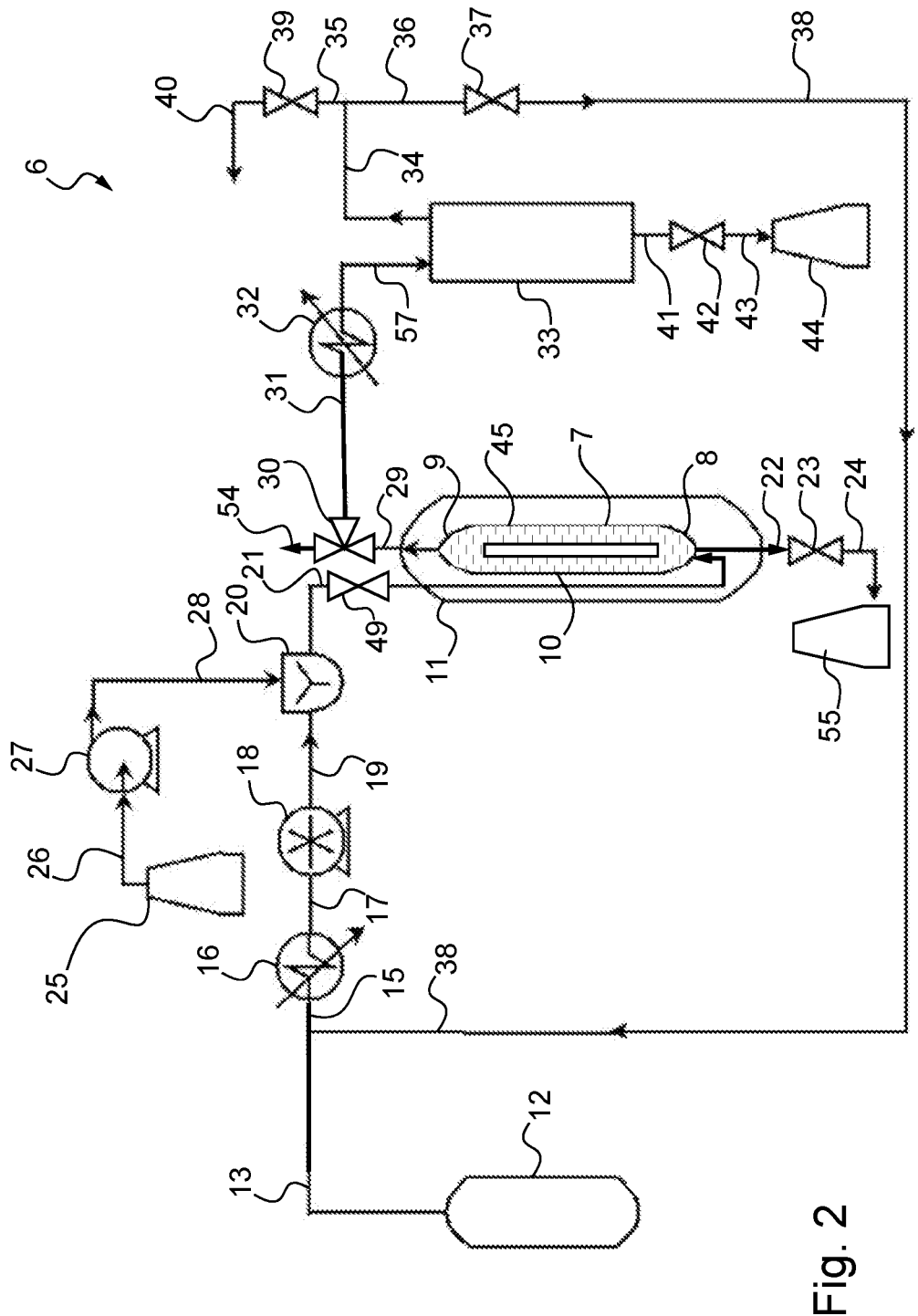
FIG. 2 diagrammatically represents an installation for implementation of the extracting step (1) of the process according to the invention, in static mode and in dynamic mode.

FIG. 2 diagrammatically represents an installation 6 for implementation of the extracting step (1) of the process according to the invention on a structure 10 of lignocellulosic material which is wood, for example beech. The installation 6 enables both extraction in static mode and extraction in dynamic mode. As will be explained below, the implementation of each of these embodiments does not require the use of all the components of the installation 6.

The installation 6 comprises a high pressure cell 7 (for the extraction), a separator 33, a storage container 12 for fluid, which is $CO_2$, as well as a storage container 25, which here serves for storage of the cosolvent, which is a cosolvent composed of a water-ethanol mixture.

The installation 6 also comprises a cosolvent pump 27, a fluid pump 18, a mixer 20, a cooler 16, and a heater 32. The cooler 16 is a heat exchanger enabling cooling of the fluid passing through it by indirect contact with a heat-carrying fluid. The heater 32 is a heat exchanger enabling heating of the fluid passing through it to maintain its temperature constant by indirect contact with a heat-carrying fluid.

The installation 6 also comprises different sensors of temperature, pressure and flow (not shown).

The high-pressure cell 7 comprises a sintered member 8 in top position, able to support the structure of lignocellulosic material 10, and a sintered member 9 in top position. These sintered members 8 and 9 enable the lignocellulosic material to remain within the high-pressure cell 7 and even enable the homogenous penetration of the fluid within the high pressure cell 7.

A double heating jacket 11 is present around the high-pressure cell 7 so as to control its temperature. In static mode, the double jacket 11 could be replaced by a heater.

For the implementation of the extracting step (1), whether it be in static mode or in dynamic mode, the structure 10 is first of all placed vertically in the high-pressure cell 7 on the sintered member 8.

In static mode, the high-pressure cell 7 in which is placed the structure 10 is supplied, in a first period, with cosolvent in the following manner: the cosolvent present in the container 25 is conveyed, by a pipe 26 to the pump 27 then, via a pipe 28 to the mixer 20 then to the cell 7 by a pipe 21, where it is placed in contact with the structure 10 present in the cell 7. A dual-inlet valve 49 is present on the pipe 21, which enables the supply to the cell 7 with cosolvent to be interrupted. In a second period, the fluid provided to be placed in supercritical or subcritical phase and present in the container 12 (which, here, is a bottle of $CO_2$) is conveyed, via a pipe 13 then a pipe 15, to the heater 16 then via a pipe 17 to the pump 18 then via a pipe 19 to the mixer 20 then to the pipe 21, where it joins the high-pressure cell 7 which contains the structure 10 and the cosolvent. In the case of the static mode, the mixer 20 therefore only plays the role of a simple pipe, alternately supplied with the cosolvent then with the fluid.

Lastly, the high-pressure cell 7 containing the structure 10, the cosolvent and the fluid, is heated using the heating jacket 11 and is pressurized in order to attain the conditions of pressure and temperature desired such that the fluid passes into supercritical phase. The fluid solubilizes the cosolvent, then the fluid phase containing the cosolvent 45 disseminates within the structure 10 and swells the structure 10, thereby achieving the solubilization of the lignin.

At the end of this extracting step, the high-pressure cell 7 is depressurized by a three-way valve 30 thereby achieving the partial extraction of the lignin. The extract containing the lignin and possible traces of cosolvent is then collected by the action of a valve 23 into a storage container 55. Thus, a pipe 22 conveys it to the valve 23, then a pipe 24 conveys it to the storage container 55. In static mode, an alternative is to collect the extract by the pipe 57.

The valve 30, supplied by a pipe 29 present in top position of the cell 7, enables the fluid to be evacuated in gaseous form by a pipe 54.

In dynamic mode, the high-pressure cell 7 is supplied by a mixture of the fluid provided to be placed in supercritical phase and with the cosolvent in the following manner: the cosolvent present in the container 25 is conveyed, by means of the pump 27 to the mixer 20. The fluid present in the container 12 is pumped to the mixer 20. The mixer 20 achieves a mixture of the fluid and of the cosolvent which is pumped by the pump 49 into the cell 7, where it is placed in contact with the structure 10. The valve 30 is then opened which enables said mixture to flow to the separator 33 by the pipe 29, the valve 30, a pipe 31, the heater 32, and a pipe 57. Said mixture next flows by a pipe 34 (which divides into two pipes 35 and 36), a pipe 36, a valve 37, and a pipe 38, until it arrives upstream of the pipe 15 which it meets, and on to reach the cell 7, so forming a flow loop for the fluid phase.

At the end of this extracting step, the high-pressure cell 7 and the separator 33 are depressurized by a two-way valve 39, supplied by the pipe 35. The separator 33 makes it possible to recover the extract comprising the lignin and possible traces of cosolvent by a pipe 41, a valve 42, then a pipe 43 and on to reach a storage container 44. The fluid is evacuated through the pipe 34, then the pipe 35 via the valve 39 to exit in gaseous form by a pipe 40.

The components of the installation 6, and in particular the high-pressure cell 7 and the separator 33 and the various pipes, are cleaned at the end of the process.

Figure 3:
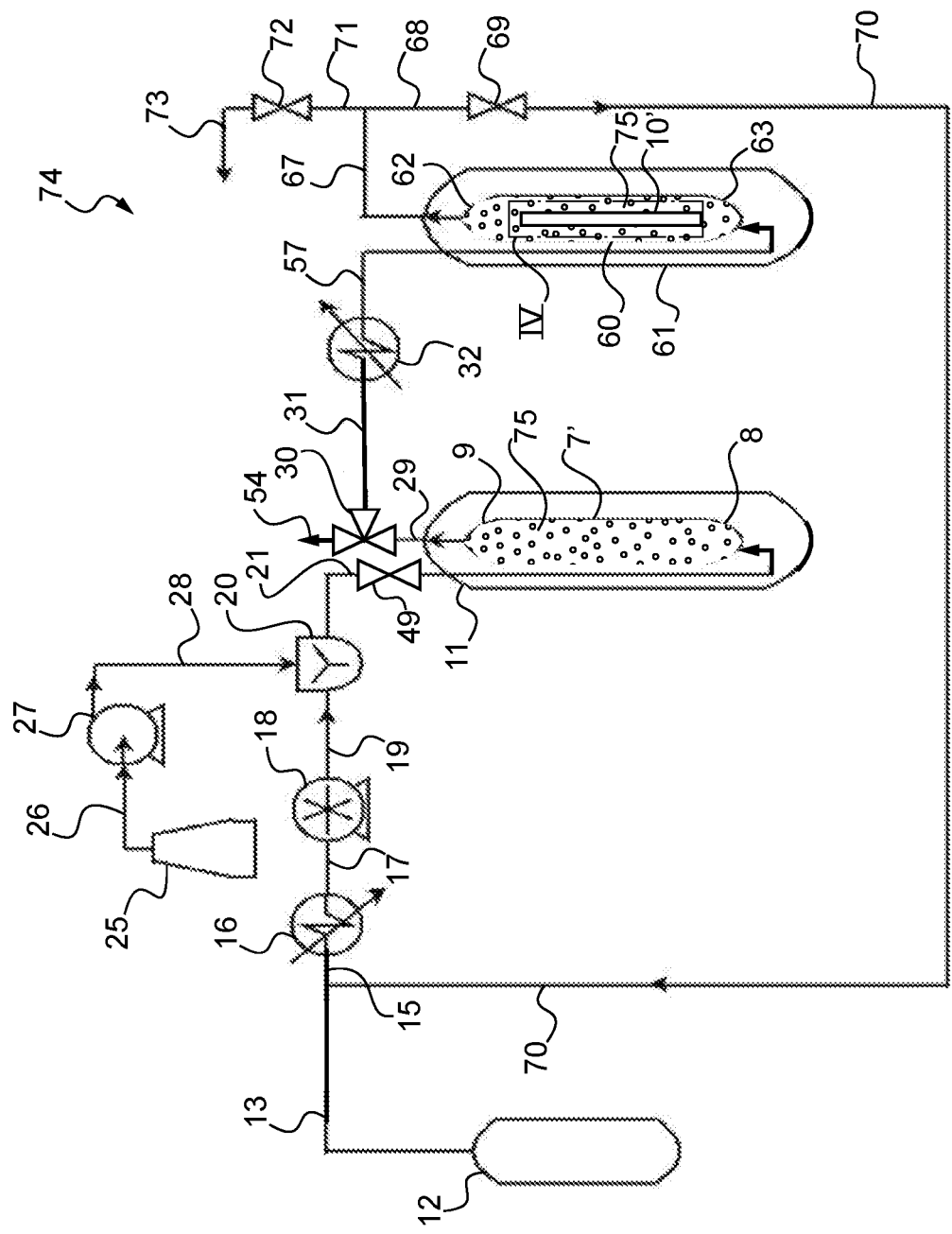
FIG. 3 diagrammatically represents an installation for implementation of the filling step (2) of the process according to the invention, in static mode and in dynamic mode.
Figure 4:
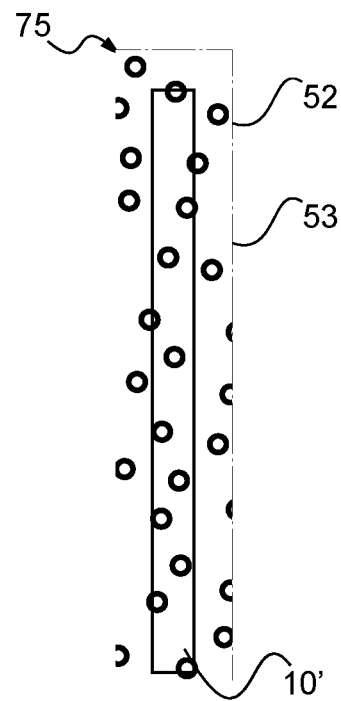
FIG. 4 represents a more detailed depiction of FIG. 3.

FIGS. 3 and 4 diagrammatically represent an installation 74 for implementation of the filling step (2) of the process according to the invention, in static mode or in dynamic mode, FIG. 4 representing a detail (IV) of FIG. 3.

The installation 74 enables the implementation of the filling step (2) on a structure 10' of lignocellulosic material that is delignified or else delignified and functionalized. This structure 10' is of wood, for example of beech. The filling compound here is a polymer.

The installation 74 enables both filling in static mode and filling in dynamic mode. As will be explained below, the implementation of each of these embodiments does not require the use of all the components of the installation 74.

The installation 74 comprises a saturator (which is a high-pressure cell) 7', a high-pressure cell 60 (in which the impregnation is carried out), the storage container 12 for fluid, here $CO_2$, as well as the storage container 25, which here serves alternately to store the filling compound then the cosolvent. The saturator 7' is similar to the cell 7 of FIG. 2 but only plays the same role for the extracting step illustrated in FIG. 2, which explains the difference in numbering.

The installation 74 also comprises the pump 27, the pump 18, the mixer 20, the cooler 16, and the heater 32.

The installation 74 also comprises different sensors of temperature, pressure and flow (not shown).

The high-pressure cell 60 comprises a sintered member 63 in top position, able to support the structure of lignocellulosic material 10', and a sintered member 62 in top position. These sintered members 63 and 62 enable the lignocellulosic material to remain within the high-pressure cell 60 and even enable the homogenous penetration of the fluid within the cell 60. A double heating jacket 61 is present around the high-pressure cell 60 so as to control its temperature. In static mode, the double jacket 61 could be replaced by a heater.

For the implementation of the filling step (2), whether it be in static mode or in dynamic mode, the structure 10' is placed vertically in the high-pressure cell 60 on the sintered member 63, so as to perform the actual filling within the high-pressure cell 60. The saturator 7' is supplied with filling compound, in a first period, as follows: the filling compound present in the container 25 is conveyed, by the pipe 26 to the pump 27 then, via the pipe 28 to the mixer 20 then by the pipe 21 to the saturator 7'. The valve present on the pipe 49 enables the supply of the saturator 7' with filling compound to be interrupted.

The saturator 7' enables the solubilization of the cosolvent in the fluid in supercritical phase.

In static mode, in a second period, cosolvent is placed in the storage container 25, then, in the same way as for the filling compound, supplies the saturator 7' via the pump 27, the mixer 20, the pipe 21 and the valve 49, where it meets the filling compound.

In a third period, the fluid provided to be placed in supercritical or subcritical phase and present in the container 12 is conveyed, via the pipe 13 then the pipe 15, to the heater 16 then by the pipe 17 to the pump 18 then via the pipe 19 to the mixer 20 then to the pipe 21, from which it joins the saturator 7' which contains the filling compound and the cosolvent.

In the case of the static mode, the mixer 20 therefore only plays the role of a simple pipe, successively supplied with the filling compound, with the cosolvent then with the fluid.

Lastly, the valve 30 is open which enables the flow of the fluid present in the saturator 7' by the pipe 31, the heater 32, then the pipe 57, to reach the high-pressure cell 60. Next, the saturator 7' containing the filling compound, the cosolvent and the fluid, and the cell 60, containing the structure 10', are respectively heated using the heating jacket 11 and the heating jacket 61, and pressurized in order to attain the conditions of pressure and temperature desired such that this fluid passes into supercritical phase. The fluid in supercritical phase solubilizes the cosolvent and the filling compound, then the fluid phase containing the filling compound and the cosolvent 75 swells the structure 10' while disseminating within, as is shown very diagrammatically in FIG. 4, thereby achieving the impregnation of the structure by the filling compound 75.

In FIG. 4, it can be seen that the mixture 75 which represents the supercritical phase is composed of the fluid in supercritical phase 53 which solubilizes the filling compound 52, symbolized by inclusions (small circles). The mixture 75 swells the structure 10' while disseminating inside and a quantity of the filling compound remains trapped within the structure 10' in the depressurization step (not shown)

At the end of this filling step, the circuit comprising the saturator 7' and the high-pressure cell 60 is depressurized by a two-way valve 72. The valve 72, supplied by a pipe 67 (which divides into two pipes 71 and 68) then the pipe 71, enables the fluid to be evacuated in gaseous form by a pipe 73. A structure of wood that is delignified and filled is collected from the high-pressure cell 60.

In dynamic mode, the saturator 7' comprising the filling compound is supplied by a mixture of the fluid provided to be placed in supercritical phase and with the cosolvent in the following manner: the cosolvent present in the container 25 is conveyed, by means of the pump 27 to the mixer 20. The fluid present in the container 12 is pumped to the mixer 20. The mixer 20 forms a mixture of fluid and cosolvent which is introduced by the valve 49 into the saturator 7'. The valve 30 is then open which enables the fluid phase containing the cosolvent and the filling compound to flow from the saturator 7' to reach the cell 60, which contains the structure 10', by the pipe 29, the valve 30, the pipe 31, the heater 32, and the pipe 57. Said mixture next flows by the pipe 67, the pipe 68, a valve 69, and a pipe 70, until it arrives upstream of the pipe 15 which it meets, and on to reach the saturator 7', so forming a flow loop for the fluid.

At the end of this filling step, the depressurization is carried out by the valve 72, and a structure of wood that is delignified and filled is collected.

In static mode, at the end of this filling step, the valve 72 makes it possible to depressurize the high-pressure cell 60 and the saturator 7', and if need be to recover the $CO_2$ as a gas by the pipe 73. In static mode, an alternative is to collect the extract by the pipe 57. Furthermore, the structure of wood that is delignified and filled is collected.

Figure 5:
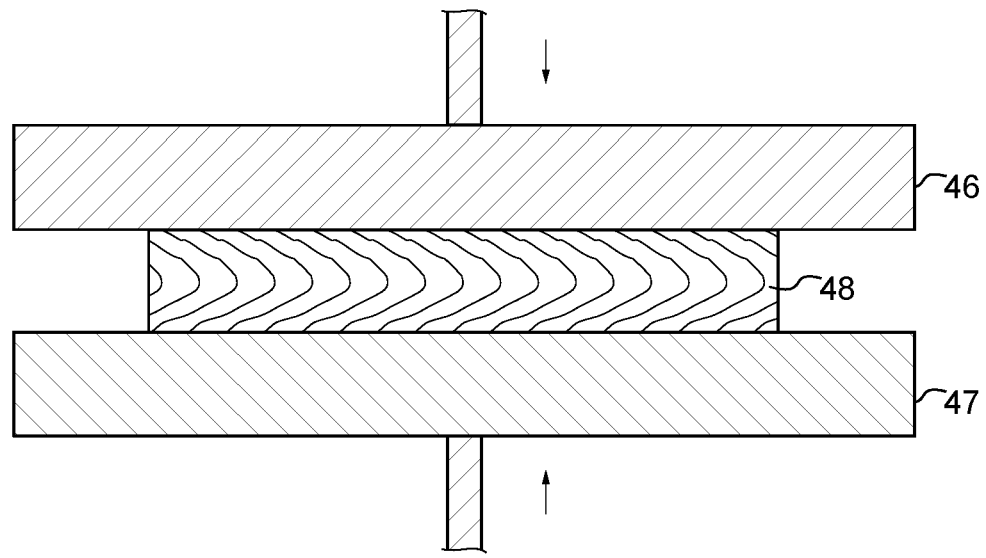
FIG. 5 diagrammatically represents the step of placing under pressure (5) of the process according to the invention.

FIG. 5 diagrammatically represents the step of placing under pressure (5) of the process according to the invention. In this case, the composite material structure 48 is compressed in a compression apparatus (46, 47) composed of two symmetrical jaws 46 and 47 able to be brought towards each other while sandwiching the structure 48 in between as a vise. On each of the parts 46 and 47 an axial force is applied which is opposite the force applied on the other part (the two forces being represented by arrows) so bringing them towards each other.

The invention will be better understood in view of the following example embodiments, with reference to the accompanying drawings.

EXAMPLES

The following examples illustrate the invention without however limiting the scope thereof.

Example 1: Treatment Process According to the Invention Wherein Step (1) is Carried Out Using Supercritical $CO_2$ in Static Mode in the Presence of a Mixture of 50% Water-50% Ethanol (Volume %)

A structure of dry wood with a transverse cut of beech of dimensions 17 mm×17 mm×9 mm (b×L×h) was subjected to the treatment process according to the invention in static mode in the installation 6 of FIG. 2 in the presence of a water-ethanol cosolvent The extracting step (1) was conducted in conditions of pressure of 1.76 MPa (17.6 bar), temperature of 180° C., an amount of cosolvent 50% water-50% ethanol (volume %) and for a treatment duration of 2 h.

At the end of this extracting step (1), the high-pressure cell (0.5 L) was depressurized and the piece of wood as well as the extract which contains the lignin were collected.

The steps of filling (2) and finishing (3) the structure of lignocellulosic material so obtained were carried out by means of the device represented in FIG. 3.

The filling step (2) was carried out according to its second embodiment, by impregnation in supercritical phase, in static mode. Thus, a monomeric solution was prepared, composed of one part butyl methacrylate and three parts styrene, after purification of these compounds using a filtration powder made from diatomite. The monomeric solution was mixed with 0.05 part catalyst (azobisisobutyronitrile).

The monomeric solution dissolved in the supercritical $CO_2$ is introduced into the high-pressure cell 60 containing the structure of lignocellulosic material. At the end of this filling step (2), the high-pressure cell 60 was depressurized by the depressurization valve 72. The structure of lignocellulosic material impregnated with monomer was collected.

This filling step was followed by a finishing step (3) during which the butyl and styrene methacrylate monomers filling the structure of lignocellulosic material resulting from the filling step (2) were thermally polymerized (80° C.) in an inert atmosphere, for 20 to 24 hours.

Example 2: Treatment Process According to the Invention Wherein Step (1) is Carried Out Using Supercritical $CO_2$ in Dynamic Mode in the Presence of a Cosolvent Mixture of 50% Water-50% Ethanol (Volume %)

A structure (plank) of dry wood with a transverse cut of beech of dimensions 200 mm×90 mm×18 mm (b×L×h) was treated by the step of partial extraction of lignin of the process according to the invention in dynamic mode and in the presence of a water/ethanol cosolvent.

The extraction was made in conditions of pressure of 2.02 MPa (202 bar) and of temperature of 118° C. for 2 h. The $CO_2$ and the water/ethanol mixture were introduced continuously into the high-pressure cell (2 L) via pumps with a flow rate of 100 g/min and 5.34 g/min respectively.

At the end of this extracting step (1), the high-pressure cell was depressurized and the plank of wood as well as the extract which contains the lignin were collected.

The steps of filling (2) and finishing (3) the structure of lignocellulosic material so obtained were carried out in identical manner to those described in Example 1.

Example 3: Treatment Process According to the Invention in which Step (1) is Carried Out with a Supercritical, Enzyme Approach A structure of dry wood of dimensions 17 mm×17 mm×10 mm was pretreated according to the invention with supercritical $CO_2$ in conditions of pressure of 20 MPa (200 bar), temperature of 165° C. and for 3 h in static mode.

The pretreated structure of lignocellulosic material was next placed in a solution which contains the enzyme laccase at a concentration of 5 g/L in conditions of temperature of 50° C., for 48 h with stirring (48 rpm). The pH of the enzyme solution was adjusted using a buffer solution in order to maintain its volume between 4.7 and 5.

The treated wood and the extract (which contains the lignin) were collected at the end of the enzyme treatment and were then dried in an autoclave in order to characterize them.

The steps of filling (2) and finishing (3) the structure of lignocellulosic material so obtained were carried out in identical manner to those described in Example 1.

The invention claimed is:
1. A method for processing an architecture of lignocellulosic material, comprising:
(a) using at least one fluid in a supercritical or subcritical phase to extract at least a portion of lignin from said architecture of lignocellulosic material to produce a delignified structure;

(b) subjecting said delignified structure to conditions sufficient to functionalize said delignified structure, thereby providing a functionalized delignified structure; and (c) bringing said functionalized delignified structure in contact with a filling compound to fill at least a portion of said functionalized delignified structure, thereby providing said functionalized delignified structure or derivative thereof comprising said filling compound or derivative thereof, wherein (a) is performed before (b), and wherein said lignocellulosic material is at least partially transparent after performance of (a), (b), and (c).

2. The method of claim 1, wherein said at least one fluid is in said supercritical phase.

3. The method of claim 1, wherein said at least one fluid is in said subcritical phase.

4. The method of claim 1, wherein said at least one fluid comprises (i) carbon dioxide ($CO_2$) in a supercritical phase, (ii) at least one alcohol in a supercritical phase, or (iii) water in a subcritical phase.

5. The method of claim 4, wherein said at least one fluid comprises said $CO_2$ in said supercritical phase, wherein said at least one fluid further comprises at least one polar cosolvent selected from the group consisting of dioxane, water, methanol, ethanol, acetic acid, and acetone.

6. The method of claim 4, wherein said at least one fluid comprises said at least one alcohol in said supercritical phase, wherein said at least one alcohol comprises t-butanol or isopropanol.

7. The method of claim 4, wherein said at least one fluid comprises said water in said subcritical phase, wherein said at least one fluid further comprises at least one base or at least one acid.

8. The method of claim 1, wherein (a) comprises extracting at least said portion but less than all of said lignin from said structure of lignocellulosic material.

9. The method of claim 1, wherein in (a) at least 40% by weight of said lignin is extracted from said structure of lignocellulosic material.

10. The method of claim 1, wherein in (a) at most 85%, in % by weight of said lignin is extracted from said structure of lignocellulosic material.

11. The method of claim 1, wherein said at least one fluid further comprises at least one enzyme selected from the group consisting of laccase, lignin peroxidase (LiP), manganese peroxidase (MnP) and xylanase.

12. The method of claim 1, wherein said at least one fluid further comprises at least one material selected from the group consisting of 2,2'-azino-di(3-ethylbenzothiazolin-6-sulfonic acid) (ABTS), 1-hydroxybenzotriazole (HBT), N-hydroxyphthalimide (HPI), N-hydroxy-phenylacetamide (NHA), (2,2,6,6-tetramethylpiperidine-1-yl)oxy (TEMPO), and violuric acid.

13. The method of claim 1, wherein (b) comprises activating hydroxyl groups of said delignified structure or oxidizing said delignified structure.

14. The method of claim 13, wherein (b) comprises activating hydroxyl groups of said delignified structure.

15. The method of claim 13, wherein (b) comprises oxidizing said delignified structure.

16. The method of claim 1, wherein (b) comprises using at least another fluid in a supercritical or subcritical phase.

17. The method of claim 16, wherein said at least another fluid is (i) carbon dioxide ($CO_2$) in a supercritical phase, or (ii) water in a subcritical phase.

18. The method of claim 1, wherein (c) further comprises heating said filling compound to cause said filling compound to react and form one or more polymers filling said at least said portion of said functionalized delignified structure.

19. The method of claim 1, wherein said filling compound is solubilized to form a monomeric solution.

20. The method of claim 19, wherein said monomeric solution comprises at least one monomer selected from the group consisting of a methacrylate, a phthalate, a nitrile, a styrene, a styrenic derivative, a vinyl compound, an ethylenic compound, a butadiene, isoprene, a terpene, a glycerol, a glycerol derivative, a sugar derivative, a furfural derivative, a lactic derivative, a formic acid derivative, a castor oil-derived monomer, a hydroxyalkanoic acid, a bio-ethylene, a bio-ethylene glycol, a bio-propylene, a bio-1,4-butanediol, and a lignin derivative.

\* \* \* \* \*